United States Patent
Kanehira et al.

(10) Patent No.: US 9,354,752 B2
(45) Date of Patent: May 31, 2016

(54) SENSOR APPARATUS AND INFORMATION PROCESSING APPARATUS

(75) Inventors: Hiroki Kanehira, Miyagi (JP); Hidetoshi Honda, Miyagi (JP); Masato Ishigaki, Miyagi (JP); Hiroto Kawaguchi, Miyagi (JP)

(73) Assignee: Sony Corporation, Tokyo (JP)

( * ) Notice: Subject to any disclaimer, the term of this patent is extended or adjusted under 35 U.S.C. 154(b) by 10 days.

(21) Appl. No.: 13/061,434

(22) PCT Filed: Mar. 9, 2010

(86) PCT No.: PCT/JP2010/001661
§ 371 (c)(1),
(2), (4) Date: Feb. 28, 2011

(87) PCT Pub. No.: WO2010/106759
PCT Pub. Date: Sep. 23, 2010

(65) Prior Publication Data
US 2011/0157087 A1    Jun. 30, 2011

(30) Foreign Application Priority Data

Mar. 19, 2009  (JP) ................................ 2009-067303
Nov. 10, 2009  (JP) ................................ 2009-257532

(51) Int. Cl.
*G06F 3/041* (2006.01)
*G06F 3/044* (2006.01)

(52) U.S. Cl.
CPC ............... *G06F 3/044* (2013.01); *G06F 3/041* (2013.01); *G06F 3/0414* (2013.01)

(58) Field of Classification Search
USPC ...................... 345/173–178; 178/18.01–18.06
See application file for complete search history.

(56) References Cited

U.S. PATENT DOCUMENTS 6,492,979 B1 * 12/2002  Kent et al. ...................... 345/173
7,436,393 B2 * 10/2008  Hong et al. ................... 345/173
(Continued)

FOREIGN PATENT DOCUMENTS

DE    202008001970 U1    6/2008
EP          1059604 A2   12/2000
(Continued)

OTHER PUBLICATIONS

International Search Report for PCT/JP2007/052128 dated May 22, 2007.
(Continued)

*Primary Examiner* — Quan-Zhen Wang
*Assistant Examiner* — Chad Dicke
(74) *Attorney, Agent, or Firm* — K&L Gates LLP

(57) ABSTRACT

A sensor apparatus and an information processing apparatus having excellent operability are provided. A sensor apparatus includes a touch panel, a casing, and a pressure-sensitive sensor. The touch panel includes an input operation surface and detects a position at which an operator comes into contact with the input operation surface directly or indirectly. The casing accommodates the touch panel. The pressure-sensitive sensor includes a first electrode fixed to the touch panel, a second electrode fixed to the casing, and an elastic body arranged between the touch panel and the casing and elastically supporting the touch panel with respect to the casing. The pressure-sensitive sensor detects a pressing force input to the input operation surface, as a change of a capacitance between the first and second electrodes.

13 Claims, 30 Drawing Sheets

(56) References Cited

U.S. PATENT DOCUMENTS

| | | | |
|---|---|---|---|
| 8,169,416 B2* | 5/2012 | Han | 345/173 |
| 8,212,792 B2* | 7/2012 | Kent | 345/174 |
| 2001/0024194 A1* | 9/2001 | Shigetaka et al. | 345/173 |
| 2002/0149571 A1 | 10/2002 | Roberts | |
| 2004/0156168 A1 | 8/2004 | LeVasseur et al. | |
| 2007/0171212 A1* | 7/2007 | Sakurai et al. | 345/177 |
| 2009/0091551 A1* | 4/2009 | Hotelling et al. | 345/174 |
| 2010/0020039 A1* | 1/2010 | Ricks et al. | 345/173 |
| 2010/0053854 A1 | 3/2010 | Nishikawa et al. | |
| 2010/0103127 A1* | 4/2010 | Park et al. | 345/173 |

FOREIGN PATENT DOCUMENTS

| | | | |
|---|---|---|---|
| EP | 1983411 A1 | 10/2008 | |
| JP | 63-257824 | 10/1988 | |
| JP | 08-147092 | 7/1996 | |
| JP | 10-198503 | 7/1998 | |
| JP | 11-212725 | 8/1999 | |
| JP | 2000-047808 | 2/2000 | |
| JP | 2000-347807 | 12/2000 | |
| JP | 2004-518188 | 6/2004 | |
| JP | 2006-126997 | 5/2006 | |
| WO | 2007-091600 A1 | 8/2007 | |
| WO | 2008/065205 A1 | 6/2008 | |
| WO | WO2008065205 * | 6/2008 | |
| WO | 2009/023888 A2 | 2/2009 | |
| WO | WO 2009123388 A1 * | 10/2009 | G06F 3/044 |

OTHER PUBLICATIONS

Japanese Office Action issued Apr. 16, 2013 for corresponding Japanese Patent Application No. 2009-257532.

Extended European Search Report issued May 27, 2013 for corresponding European Appln. No. 10753256.6.

European Office Action issued Feb. 21, 2014 for corresponding European Appln. No. 10753256.6.

* cited by examiner

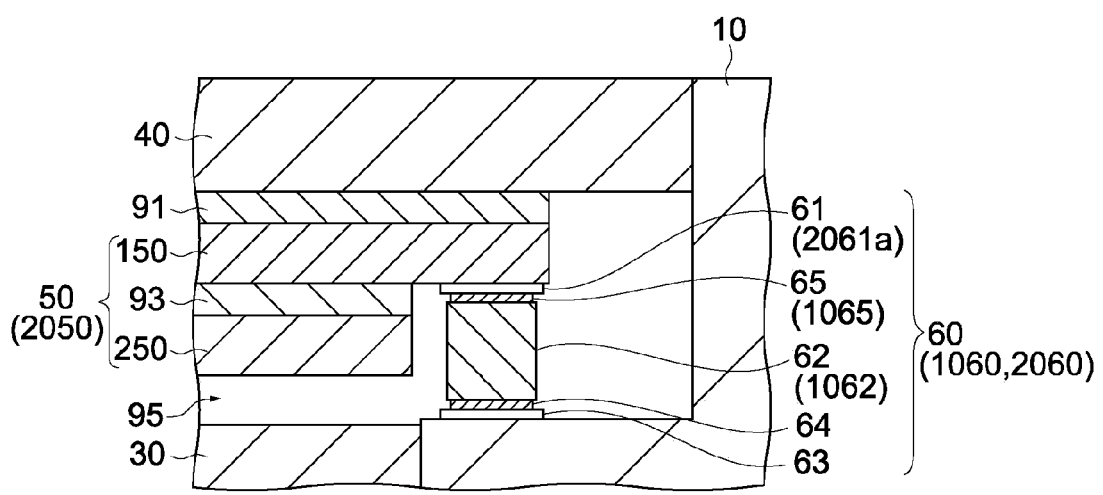
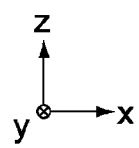
FIG.4

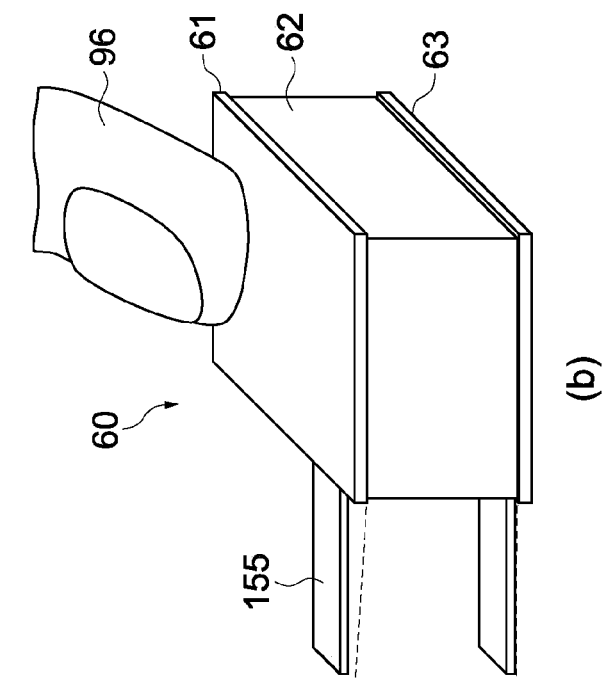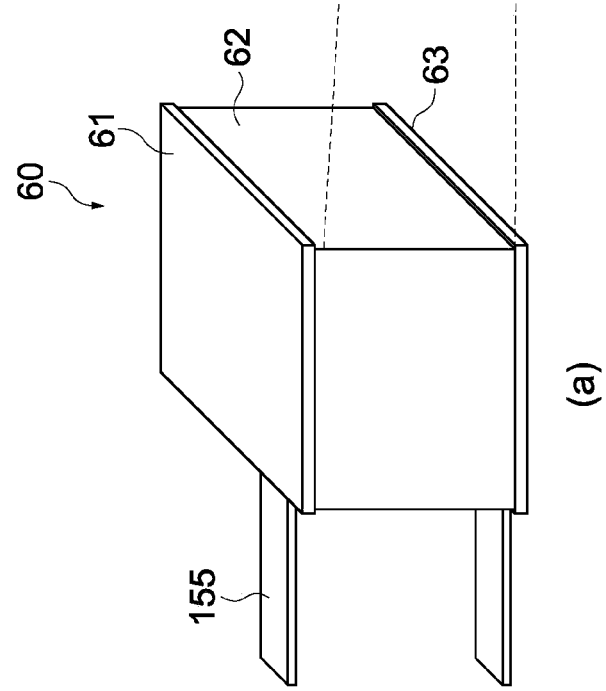
FIG.5

SENSOR APPARATUS AND INFORMATION PROCESSING APPARATUS

CROSS REFERENCE TO RELATED APPLICATIONS

The present application is a National Stage of International Application No. PCT/JP2010/001661 filed on Mar. 9, 2010 and which claims priority to Japanese Patent Application Nos. 2009-067303 filed on Mar. 19, 2009 and 2009-257532 filed on Nov. 10, 2009, the entire contents of which are being incorporated herein by reference.

BACKGROUND

The present disclosure relates to a sensor apparatus including a touch panel and to an information processing apparatus.

Various electronic apparatuses, for example, information processing apparatuses such as personal computers and cellular phones, include devices capable of being input with touch panels. For the touch panel as a sensor apparatus, an input device of a capacitive system, a resistive system, or the like is used. For example, in a capacitive touch panel, an input operator such as a finger and a contact pen is caused to come into contact with a touch panel operation surface, and accordingly a contact position thereof is detected and an input operation is made (see, for example, Patent Document 1).

Patent Document 1: Japanese Patent Application Laid-open No. Hei 8-147092

SUMMARY

In the touch panel described above, at a time of input operation, it is necessary to separate the input operator from the operation surface once and then cause the input operator to come into contact with the operation surface again in order to perform the next input determination. For that reason, the conventional sensor apparatus has a problem of poor operability.

In view of the circumstances as described above, it is desirable to provide a sensor apparatus and an information processing apparatus with excellent operability.

According to an embodiment, there is provided a sensor apparatus including a touch panel, a casing, and a pressure-sensitive sensor.

The touch panel includes an input operation surface and detects a position at which an operator comes into contact with the input operation surface directly or indirectly.

The casing accommodates the touch panel.

The pressure-sensitive sensor includes a first electrode fixed to the touch panel, a second electrode fixed to the casing, and an elastic body arranged between the touch panel and the casing and elastically supporting the touch panel with respect to the casing. The pressure-sensitive sensor detects a pressing force input to the input operation surface, as a change of a capacitance between the first and second electrodes.

According to the sensor apparatus, since the touch panel is provided, it is possible to perform position detection of the input operation surface with which the operator comes into contact. Further, since the pressure-sensitive sensor in which a capacitance is changed in accordance with a pressing force is provided, it is possible to detect a pressing force with respect to the input operation surface by the operator, based on the capacitance change. Accordingly, it is possible to judge an input determination based on the detection of the pressing force. Accordingly, when the operator merely comes into direct or indirect contact with the input operation surface, it is not judged to be an input determination, with the result that erroneous inputs can be reduced. In addition, the operator can be moved in a state of coming into direct or indirect contact with the input operation surface, which improves the operability.

In a case where the input operation surface has a rectangular shape, the pressure-sensitive sensor can be arranged at each of four corners of the touch panel.

Accordingly, it is possible to highly precisely detect a pressing force without depending on a press position with respect to the input operation surface.

The elastic body may be formed in an annular shape along a circumference of the touch panel.

Accordingly, it is possible to obtain a stable operational feeling without depending on a press position. Further, the elastic body can be given a function as a sealing member attached between the touch panel and the casing.

The first electrode may be formed correspondingly to each of the four corner positions of the touch panel. In this case, the plurality of first electrodes may be electrically connected to each other.

The capacitance changes detected at positions at which the first electrodes are formed are combined, with the result that it is possible to detect a pressing force with respect to the input operation surface highly precisely.

The first and second electrodes may be each formed in the annular shape along the circumference of the touch panel, by which the same effect as that described above can also be obtained. The "annular shape" used herein includes a continuous annular shape along the circumference of the touch panel, and a noncontinuous annular shape partially having a notch portion. The same holds true for the meaning of the "annular elastic body".

The sensor apparatus may further include a judgment unit configured to judge the pressing force based on a combined value of capacitance changes detected by the respective pressure-sensitive sensors arranged at the four corner positions of the touch panel. Accordingly, it is possible to highly precisely detect a pressing force without depending on a press position with respect to the input operation surface. The judgment unit may judge the pressing force from the combined value of the capacitance changes, or may judge the pressing force from an average value obtained by dividing the combined value by the number of pressure-sensitive sensors.

The touch panel may include a first substrate having a first electrode pattern, a second substrate having a second electrode pattern, and a bonding layer that bonds the first substrate and the second substrate to each other. In this case, the first electrode of the pressure-sensitive sensor can be formed on the first substrate of the touch panel.

Accordingly, it becomes possible to form the first electrode pattern of the touch panel and the first electrode of the pressure-sensitive sensor on the first substrate in common.

The first electrode may be constituted of two electrode portions that are opposed to the second electrode with the elastic body being interposed therebetween.

Accordingly, it becomes unnecessary to lead wires for the second electrode, which makes it possible to simplify the structure.

The sensor apparatus may further include a first conductor layer and a first dielectric layer. The first conductor layer is provided correspondingly to the second electrode. The first dielectric layer is provided between the first conductor layer and the second electrode, and has a dielectric constant smaller than that of the elastic body.

Accordingly, it is possible to suppress a potential of the second electrode from being varied due to disturbance, and stabilize the detection sensitivity of the pressure-sensitive sensor.

The sensor apparatus may further include a second conductor layer and a second dielectric layer. The second conductor layer is provided correspondingly to the first electrode. The second dielectric layer is provided between the second conductor layer and the first electrode, and has a dielectric constant smaller than that of the elastic body.

Accordingly, it is possible to suppress a potential of the first electrode from being varied due to disturbance, and stabilize the detection sensitivity of the pressure-sensitive sensor.

The touch panel may be formed of a capacitive touch panel. The touch panel is not limited to this, and other touch panel of a resistive system or the like may be used.

The sensor apparatus may further include a judgment unit configured to judge presence/absence of an input made with the operator based on a magnitude of a variation in temporal change of an output from the pressure-sensitive sensor. Accordingly, even when an input operation involving a non-smooth movement of the operator is made, if a variation of the output from the pressure-sensitive sensor is small, it can be judged to be a normal movement and then to be an input.

According to an embodiment, there is provided an information processing apparatus including a touch panel, a casing, a pressure-sensitive sensor, and a display panel.

The touch panel includes an input operation surface and detects a position at which an operator comes into contact with the input operation surface directly or indirectly.

The casing accommodates the touch panel.

The pressure-sensitive sensor includes a first electrode fixed to the touch panel, a second electrode fixed to the casing, and an elastic body arranged between the touch panel and the casing and elastically supporting the touch panel with respect to the casing. The pressure-sensitive sensor detects a pressing force input to the input operation surface, as a change of a capacitance between the first and second electrodes.

The display panel is arranged on a back surface side of the touch panel and accommodated in the casing.

As described above, a sensor apparatus with excellent operability can be obtained.

Additional features and advantages are described herein, and will be apparent from, the following Detailed Description and the figures.

BRIEF DESCRIPTION OF THE FIGURES

FIG. 4 An enlarged view of an area surrounded by the circle A of FIG. 1.

FIG. 5 Diagrams for explaining the principle of operation of a pressure-sensitive sensor incorporated in the information processing apparatus shown in FIG. 1.

DETAILED DESCRIPTION

First Embodiment

Hereinafter, a first embodiment will be described with reference to the drawings.

[Structure of Sensor Apparatus]

Figure 1:
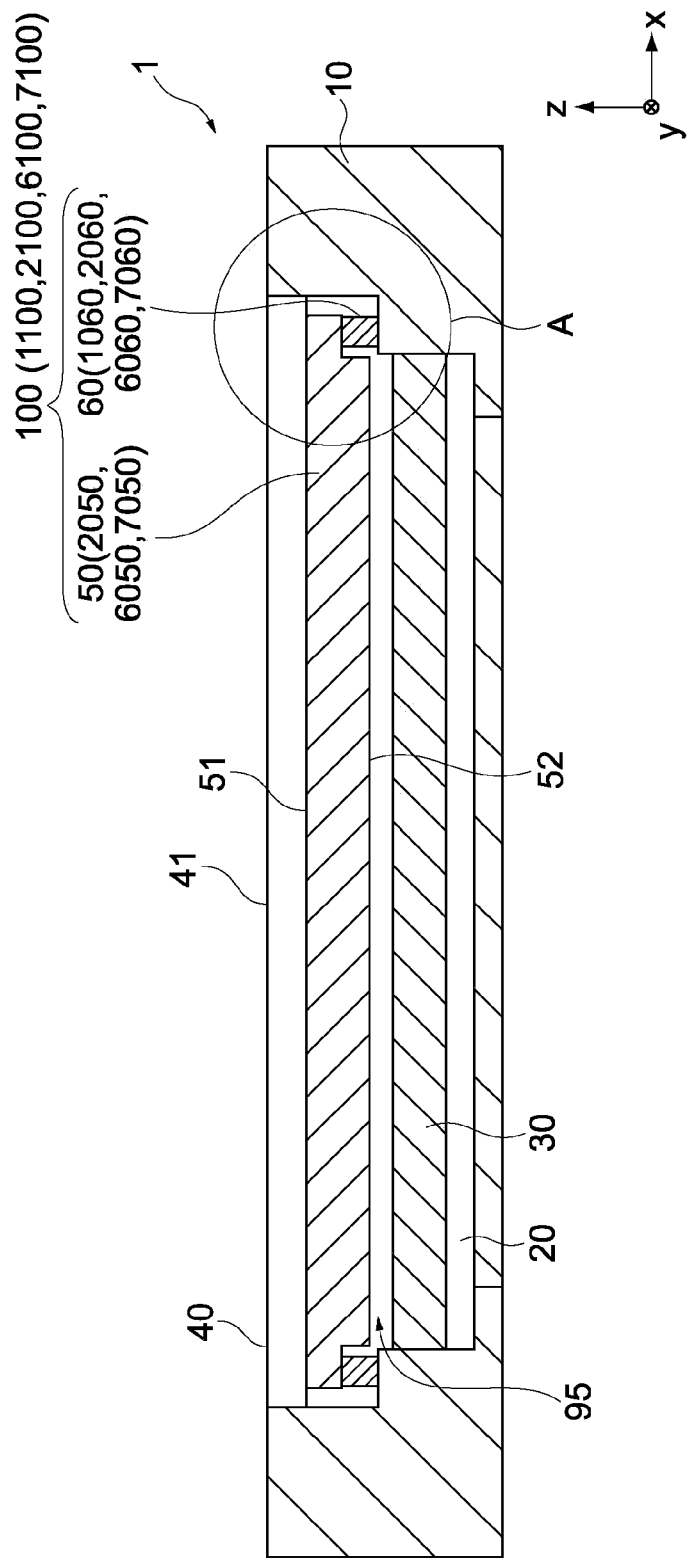
FIG. 1 A schematic cross-sectional view of an information processing apparatus according to first, second, third, seventh, and eighth embodiments.
Figure 2:
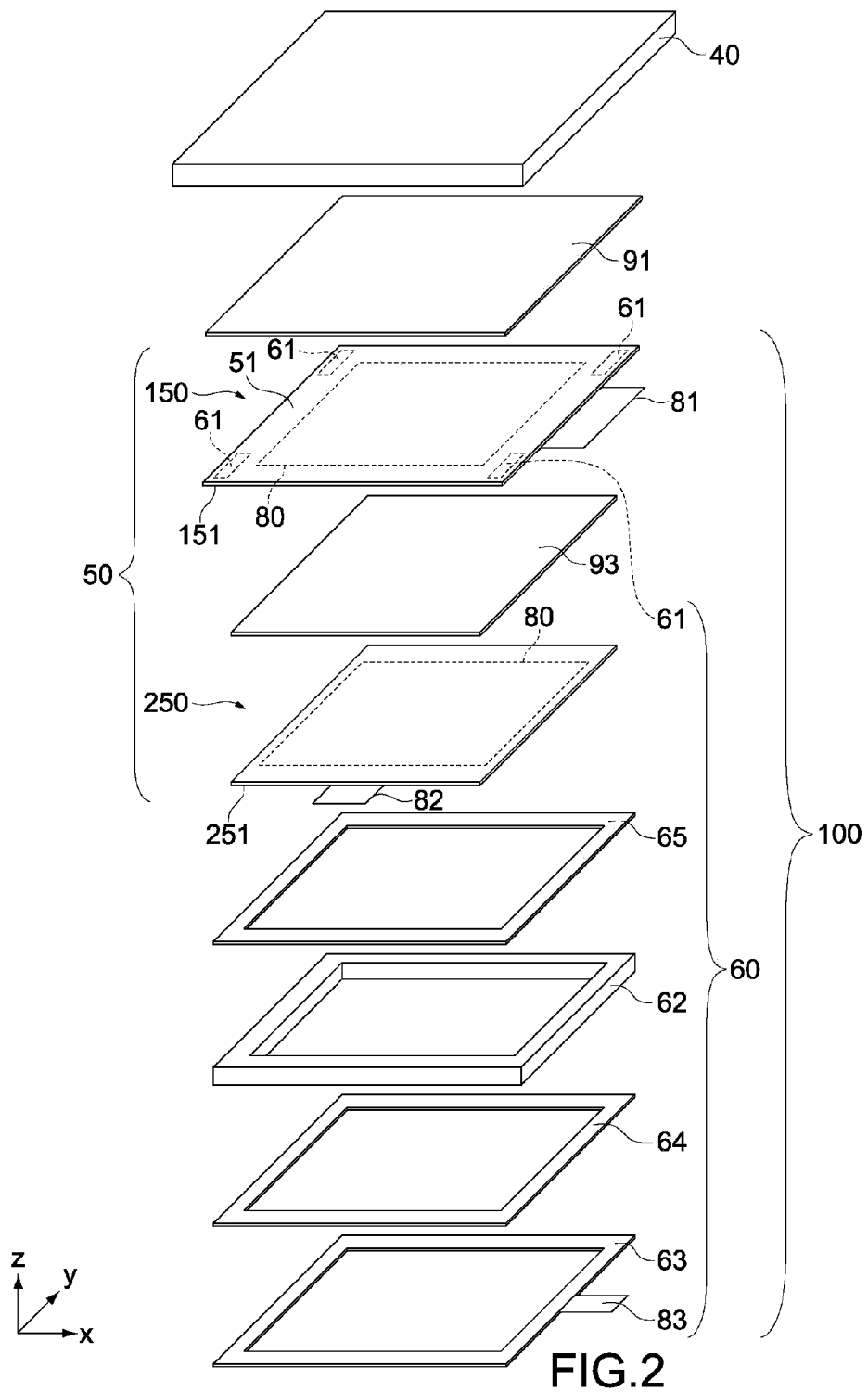
FIG. 2 A schematic exploded perspective view of the information processing apparatus shown in FIG. 1 according to the first embodiment, in which the illustration of a casing is omitted.
Figure 3:
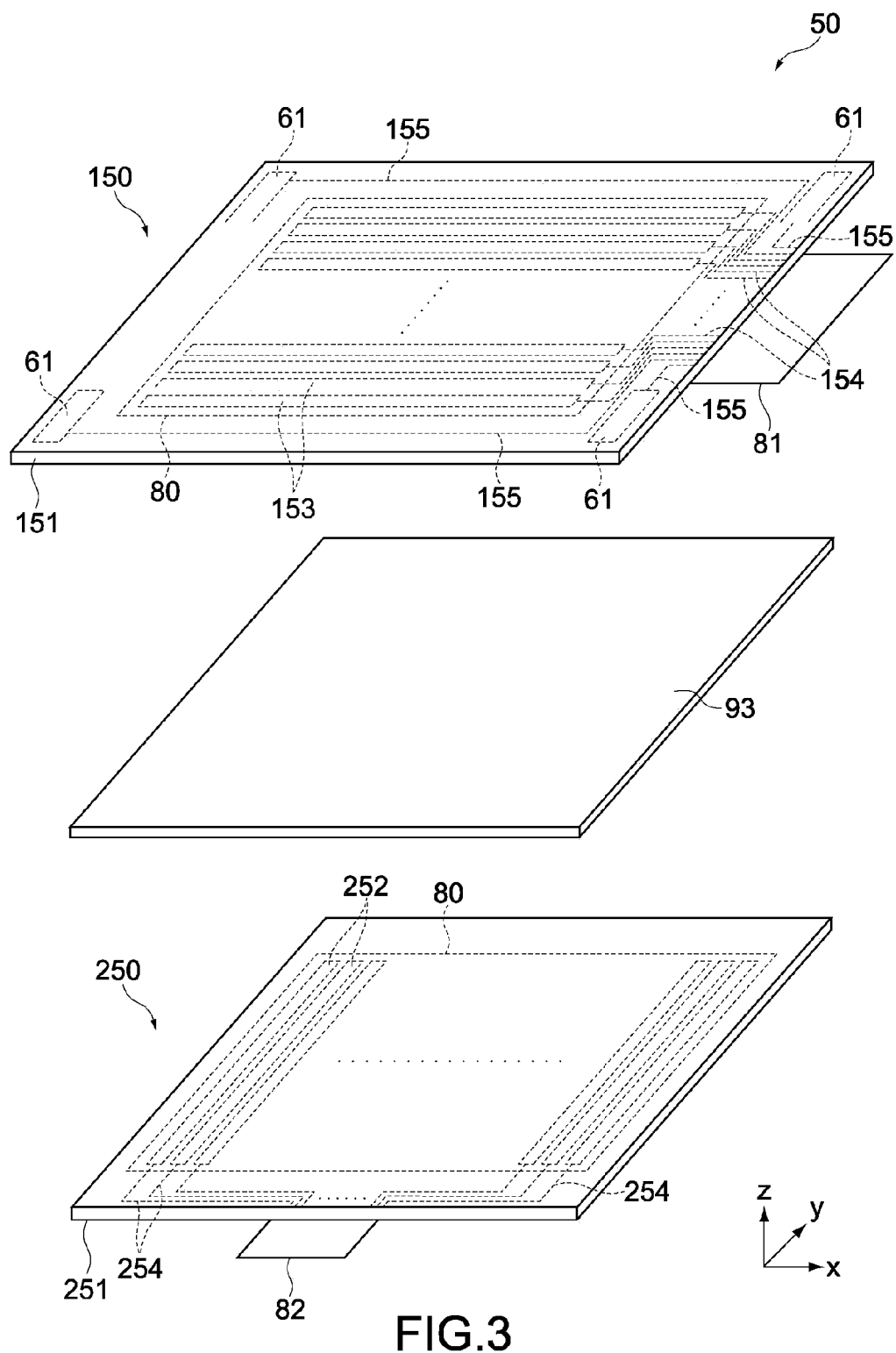
FIG. 3 A partially enlarged view of FIG. 2, corresponding to an exploded perspective view of a touch panel.
Figure 6:
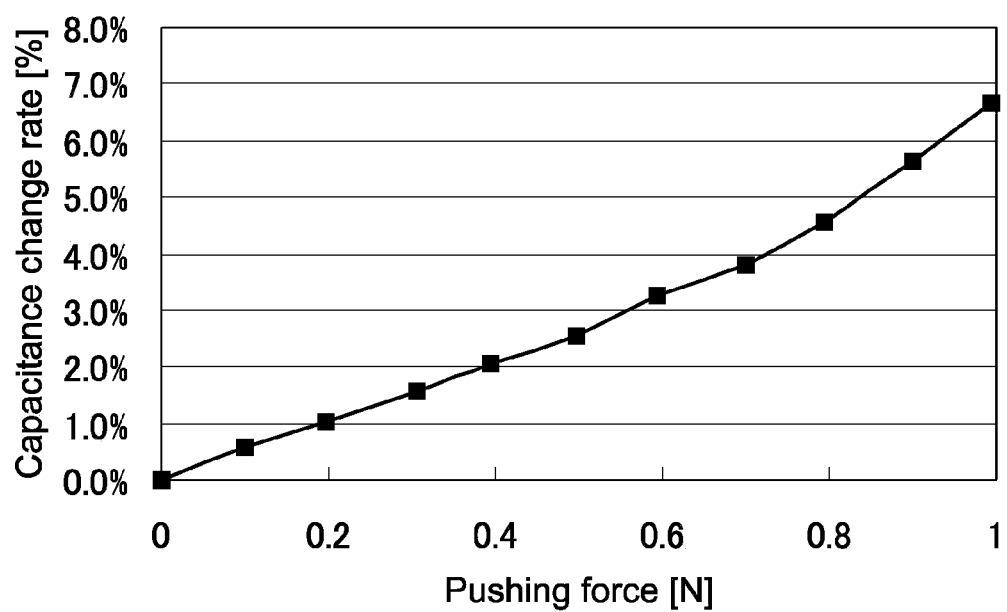
FIG. 6 A diagram showing characteristics of the pressure-sensitive sensor shown in FIG. 5.
Figure 7:
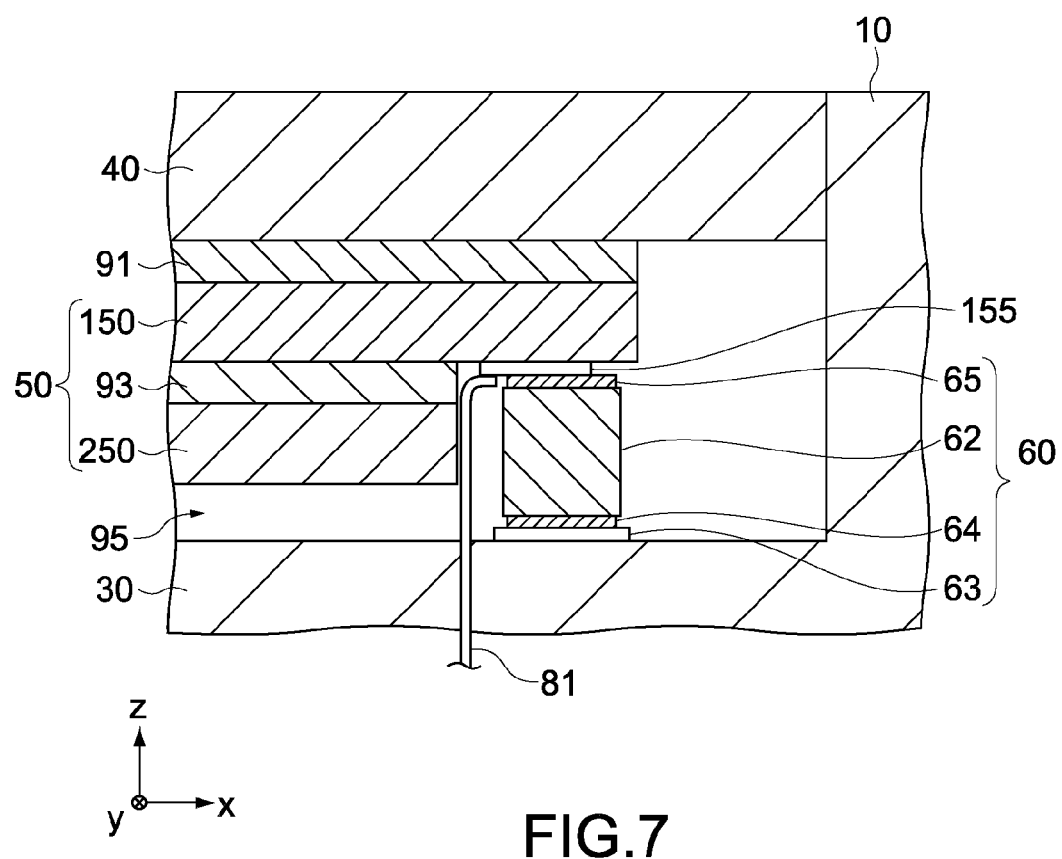
FIG. 7 A diagram showing an arrangement example of an FPC board in the information processing apparatus.

FIG. 1 is a schematic cross-sectional view of an information processing apparatus including a sensor apparatus. FIG. 2 is a schematic exploded perspective view of the information processing apparatus shown in FIG. 1, in which the illustration of a casing is omitted. FIG. 3 is a partially enlarged view of FIG. 2, and corresponds to an exploded perspective view of a touch panel. In FIG. 2, an electrode structure of the touch panel is partially omitted for easy understanding of the figure, and the detailed electrode structure of the touch panel is shown in FIG. 3. FIG. 4 is an enlarged view of an area surrounded by the circle A of FIG. 1. FIG. 5 are diagrams for explaining the principle of operation of a pressure-sensitive sensor incorporated in the information processing apparatus shown in FIG. 1. FIG. 6 is a diagram showing characteristics of the pressure-sensitive sensor shown in FIG. 5. FIG. 7 is a diagram showing an arrangement example of an FPC (Flexible Printed Circuit) board in the information processing apparatus. In the figures, for easy understanding of the structures, the structures are illustrated at a scale different from the actual one, and the number of wires or the like is also different from the actual one in the illustration.

As shown in FIGS. 1 to 4, an information processing apparatus 1 includes a top plate 40, a sensor apparatus 100, a liquid crystal panel 30 as a display panel, a backlight 20 that irradiates the liquid crystal panel 30 with light, and a casing 10 that accommodates those above. In the information processing apparatus 1, the top plate 40, the sensor apparatus 100, the liquid crystal panel 30, and the backlight 20 are arranged in the stated order when viewed from a user side. The sensor apparatus 100 includes a touch panel 50 and a pressure-sensitive sensor 60.

The top plate 40 is for protecting the surface of the touch panel 50 located below the top plate 40, but the structure in which the top plate 40 is omitted may be possible. For the top plate 40, a transparent glass substrate or film can be used. The surface of the top plate 40 on the side opposite to the side on which the sensor apparatus 100 is arranged serves as an operator contact surface 41 with which an input operator such as a finger and a stylus comes into direct contact when a user makes an input operation. Hereinafter, description will be given while a finger is exemplified as an input operator.

The top plate 40 and the sensor apparatus 100 are bonded and fixed to each other by a bonding layer 91. The sensor apparatus 100 having a flat rectangular shape includes the touch panel 50 and a pressure-sensitive sensor 60 having a flat rectangular shape, which are bonded and fixed to each other.

The touch panel 50 has an input operation surface 51 located on the operator contact surface 41 side, and a second surface 52 located on the liquid crystal panel 30 side opposite thereto. A total of four pressure-sensitive sensors 60 are arranged one by one at four corners of a frame portion of the second surface 52 of the touch panel 50. The touch panel 50 is arranged to be positioned on the top plate 40 side, and the pressure-sensitive sensors 60 are arranged to be positioned on the liquid crystal panel 30 side. The liquid crystal panel 30 is arranged on a back surface side of the touch panel 50. In this embodiment, the operator comes into indirect contact with the input operation surface 51 via the top plate 40, and an input operation is made.

The pressure-sensitive sensor 60 constituting a part of the sensor apparatus 100 is fixedly arranged on the casing 10. The pressure-sensitive sensor 60 includes an elastic body 62, and an upper electrode 61 serving as a first electrode and a lower electrode 63 serving as a second electrode, which are arranged so as to interpose the elastic body 62 therebetween. When the operator contact surface 41 is pressed in a direction perpendicular to the operator contact surface 41 (z-axis direction in the figures), the elastic body 62 of the pressure-sensitive sensor 60 is deformed so as to be contracted, and the top plate 40 and the touch panel 50 to which the pressure-sensitive sensor 60 is bonded and fixed are moved in the pressing direction at the same time. In this way, the pressure-sensitive sensor 60 has the structure in which a thickness thereof is deformed by the press in the direction perpendicular to the operator contact surface 41 (z-axis direction in the figures). Therefore, the touch panel 50 is moved so as to come close to the liquid crystal panel 30 by a displacement of the pressure-sensitive sensor 60 that is caused by the press with the finger. In consideration of the movement amount, a gap 95 is provided between the sensor apparatus 100 and the liquid crystal panel 30.

In this embodiment, when the sensor apparatus 100 is viewed from the second surface 52 side of the touch panel 50, the pressure-sensitive sensor 60 is structured so as to protrude more than the second surface 52, but the pressure-sensitive sensor 60 may be structured so as not to protrude but to have the same height as that of the second surface 52 or be recessed.

[Touch Panel]

The touch panel 50 is a capacitive input device that detects xy coordinates on the input operation surface 51. In the capacitive touch panel 50, by detection of a part at which a capacitance is locally changed, a position on the input operation surface of the touch panel, with which a finger of a user has come into contact, and a change of this position are detected.

As shown in FIGS. 2 and 3, the touch panel 50 is structured by, for example, sequentially laminating an X electrode substrate 150 and a Y electrode substrate 250 and bonding them to each other by a bonding layer 93. The X electrode substrate 150 and the Y electrode substrate 250 each have a rectangular shape, and the Y electrode substrate 250 has an outer shape smaller than that of the X electrode substrate 150. An area in which an X transparent electrode pattern 153 for detection that is formed on the X electrode substrate 150 and a Y transparent electrode pattern 252 for detection that is formed on the Y electrode substrate 250 two-dimensionally overlap each other becomes an xy-plane coordinate detection area 80. The pressure-sensitive sensor 60 is arranged in a circumferential area (frame portion) outside the xy-plane coordinate detection area 80 of the touch panel 50. In other words, a portion of the X electrode substrate 150 that protrudes from the Y electrode substrate 250 has a frame shape in plan view, and the pressure-sensitive sensor 60 is provided in this protruding portion.

In FIGS. 2 and 3, electrode patterns or the like formed on the X electrode substrate 150 and the Y electrode substrate 250 are arranged on back surface sides of the substrates in the figures, and therefore the electrode patterns are indicated by dotted lines.

The X electrode substrate 150 includes a transparent polyimide substrate 151, the X transparent electrode pattern 153 formed on the substrate 151, the upper electrodes 61 serving as first electrodes, wires 154 electrically connected to the X transparent electrode pattern 153, and lead wires 155 electrically connected to the upper electrodes 61. A PET film substrate, a glass substrate, or the like may be used in addition to the transparent polyimide substrate 151. In the X transparent electrode pattern 153, a stripe-shaped ITO (Indium Tin Oxide) for detection, which is extended in the X-axis direction in the figures, is formed. Each of the upper electrodes 61 constitutes a part of the pressure-sensitive sensor 60. The upper electrodes 61 are formed simultaneously with the X transparent electrode pattern 153, and are formed of ITO. The upper electrodes 61 are four in total, and arranged one by one at four corners on the frame of the rectangular touch panel 50 outside the coordinate detection area 80. The four upper electrodes 61 are electrically independent of each other. The wires 154 are wires for electrically connecting the X transparent electrode pattern 153 and a circuit board (not shown) via an FPC board 81, and are extended substantially parallel to the X transparent electrode pattern 153 and collectively formed on one side of the rectangular X electrode substrate 150. The lead wires 155 are wires for electrically connecting the upper electrodes 61 and the circuit board (not shown) via the FPC board 81. The lead wire 155 is formed such that one end thereof is connected to the upper electrode 61 and the other end thereof is collected on the same side on which the wires 154 are collected. The wires 154 and the lead wires 155 are formed by printing of Ag (silver), for example. It should be noted that the upper electrodes 61 may be formed simultaneously with the wires 154 and the lead wires 155, and may be formed by printing of Ag or the like.

The Y electrode substrate 250 includes a transparent polyimide substrate 251, the Y transparent electrode pattern 252 formed on the substrate 251, and wires 254 electrically connected to the Y transparent electrode pattern 252. A PET film substrate, a glass substrate, or the like may be used in addition to the transparent polyimide substrate 251. The Y transparent electrode pattern 252 is formed by printing of a stripe-shaped ITO (Indium Tin Oxide) for detection, which is extended in the y-axis direction in the figures. The wires 254 are wires for electrically connecting the Y transparent electrode pattern 252 and a circuit board (not shown) via an FPC board 82, and are extended substantially parallel to the Y transparent electrode pattern 252 and collectively formed on one side of the rectangular Y electrode substrate 250. The wires 254 are formed by printing of Ag (silver), for example. The circuit board is arranged, for example, on a surface side of the backlight 20, opposite to the side on which the liquid crystal panel 30 is arranged.

As described above, the touch panel 50 has the structure in which the electrode patterns for detection are provided in the biaxial directions orthogonal to each other. A detection output of each of the X transparent electrode pattern 153 and Y transparent electrode pattern 252 is input to a computing circuit provided on the circuit board (not shown), and a position in the biaxial space, that is, xy coordinates are specified. A predetermined voltage is applied to each of the X transparent electrode pattern 153 and Y transparent electrode pattern 252, and electric charge is formed between the X transparent electrode pattern 153 and the Y transparent electrode pattern 252. The electric charge is changed due to the contact of the finger, and current flowing through each of the X transparent electrodes and Y transparent electrodes is changed. By detection of this change, xy coordinates can be specified and the position of the finger is detected. It should be noted that when the top plate 40 is not provided, the input operation surface 51 of the X electrode substrate 150 on which the electrode pattern is not arranged serves as an operator contact surface, with which the operator comes into contact, and an input operation is made.

[Pressure-Sensitive Sensor]

As shown in FIGS. 1 to 4, the pressure-sensitive sensor 60 includes the elastic body 62 that is formed of a dielectric material arranged between the touch panel 50 and the casing 10, the upper electrode 61, and the lower electrode 63 as the second electrode, the upper electrode 61 and the lower electrode 63 being arranged so as to interpose the elastic body 62 therebetween. The pressure-sensitive sensor 60 further includes a bonding layer 65 that bonds and fixes the elastic body 62 and the upper electrode 61, and a bonding layer 64 that bonds and fixes the elastic body 62 and the lower electrode 63. In this embodiment, the elastic bodies constituting the four pressure-sensitive sensors 60 are coupled to each other to thereby constitute one frame-shaped elastic body 62, and the four pressure-sensitive sensors 60 share one elastic body 62. Further, the lower electrodes constituting the four pressure-sensitive sensors 60 are couples to each other to thereby constitute one frame-shaped lower electrode 63, and the four pressure-sensitive sensors 60 share one lower electrode 63.

For the elastic body 62, for example, a material causing less residual distortion and having a high restoration rate (restoration speed) is used. As materials of this type, for example, a silicone rubber or a urethane rubber can be used. It is desirable for the elastic body 62 to have Young's modulus of 0.001 to 2 MPa and a response speed having a recovery time of 400 ms or less. When Young's modulus is lower than 0.001 MPa, there is a fear that a press operation is erroneously detected when the operator merely comes into direct or indirect contact with the input operation surface. When Young's modulus is higher than 2 MPa, there is a fear that the operability is degraded because a large pressing force is required.

When the recovery time is slower than 400 ms, it takes time to detect the press operation made by the input operator, and it is difficult to detect a press when a quick input operation is made, which makes operation characteristics degraded or makes it difficult to detect continuous operations such as double click. Further, it is desirable for the elastic body 62 to have a compression residual strain that is about 5% of the initial strain at maximum, in addition to the Young's modulus and response speed described above.

When the compression residual strain is larger than 5%, the sensitivity of the pressure-sensitive sensor 60 is lowered along with the deterioration of the elastic body 62 due to the long-term use. Therefore, when the compression residual strain is set to about 5% at maximum, it is possible to obtain a pressure-sensitive sensor 60 capable of maintaining the sufficient sensitivity after long-term use, and prevent the operation characteristics from being degraded.

Here, the Young's modulus was measured based on a test method conforming to the JIS (Japanese Industrial Standards) K6254. The compression residual strain was measured using a test method conforming to the JIS K6401 (test method in which compression residual strain is 50%). Further, the elastic body 62 whose thickness is, for example, about 0.1 mm to 5 mm can be used in accordance with the size of the touch panel. For example, when the touch panel is 5 inches or less, an elastic body having a thickness of about 0.1 to 5 mm is used, and when it is 5 inches or more, an elastic body having a thickness of about 0.5 mm to 5 mm is used.

In this embodiment, as the elastic body 62, "PORON" (registered trademark) manufactured by INOAC CORPORATION is used. Specifically, for example, SS10, SS24, MS40, MH48, or the like of PORON (registered trademark) is used. In PORON SS10, Young's modulus thereof is 0.01 MPa and a response speed thereof is 15 ms or less. In PORON SS24, Young's modulus thereof is 0.03 MPa and a response speed thereof is 20 ms or less. In PORON MS40, Young's modulus thereof is 0.2 MPa and a response speed thereof is 30 ms or less. In PORON MH48, Young's modulus thereof is 1.2 MPa and a response speed thereof is 30 ms or less.

The elastic body 62 only has to be deformed by about 10%, for example. In a case where an elastic body 62 having a thickness of, for example, 0.5 mm is used, the deformation only has to be about 50 μm. In this embodiment, the elastic body 62 is provided in a frame shape (annular shape) in accordance with the frame of the touch panel 50. The elastic body 62 is provided in a frame shape, with the result that it is possible to prevent dust or the like from entering between the touch panel 50 and the casing 10, specifically, the gap 95 between the touch panel 50 and the liquid crystal panel 30 from the outside, in the state of the information processing apparatus 1. In this manner, the frame-shaped elastic body 62 can be given a sealing function of preventing the entry of dust from the outside. Therefore, there is no influence on display characteristics that is caused due to the entry of dust from the outside.

As described above, the upper electrodes 61 are formed on the touch panel 50 simultaneously with the X transparent electrode pattern 153 or wires 154. Accordingly, it is unnecessary to form the upper electrodes 61 in different steps. In addition, since the upper electrode 61 constituting a part of the pressure-sensitive sensor 60, and the X transparent electrode pattern or wires formed on the touch panel 50 can be formed on the same substrate, those electrodes and the like can be collectively wired on the same FPC board 81.

The lower electrode 63 is formed by, for example, printing a conductive paste on the casing 10. For the lower electrode 63, for example, a silver paste can be used. The lower electrode 63 is arranged in a frame shape (annular shape) in accordance with the frame portion of the touch panel 50, as in the case of the elastic body 62. The lower electrode 63 is electrically connected to a circuit board (electrically not shown) via a FPC board 83. The lower electrode 63 is shared by the plurality of pressure-sensitive sensors 60, with the result that the wiring of the lower electrode 63 can be made simple.

Figure 11:
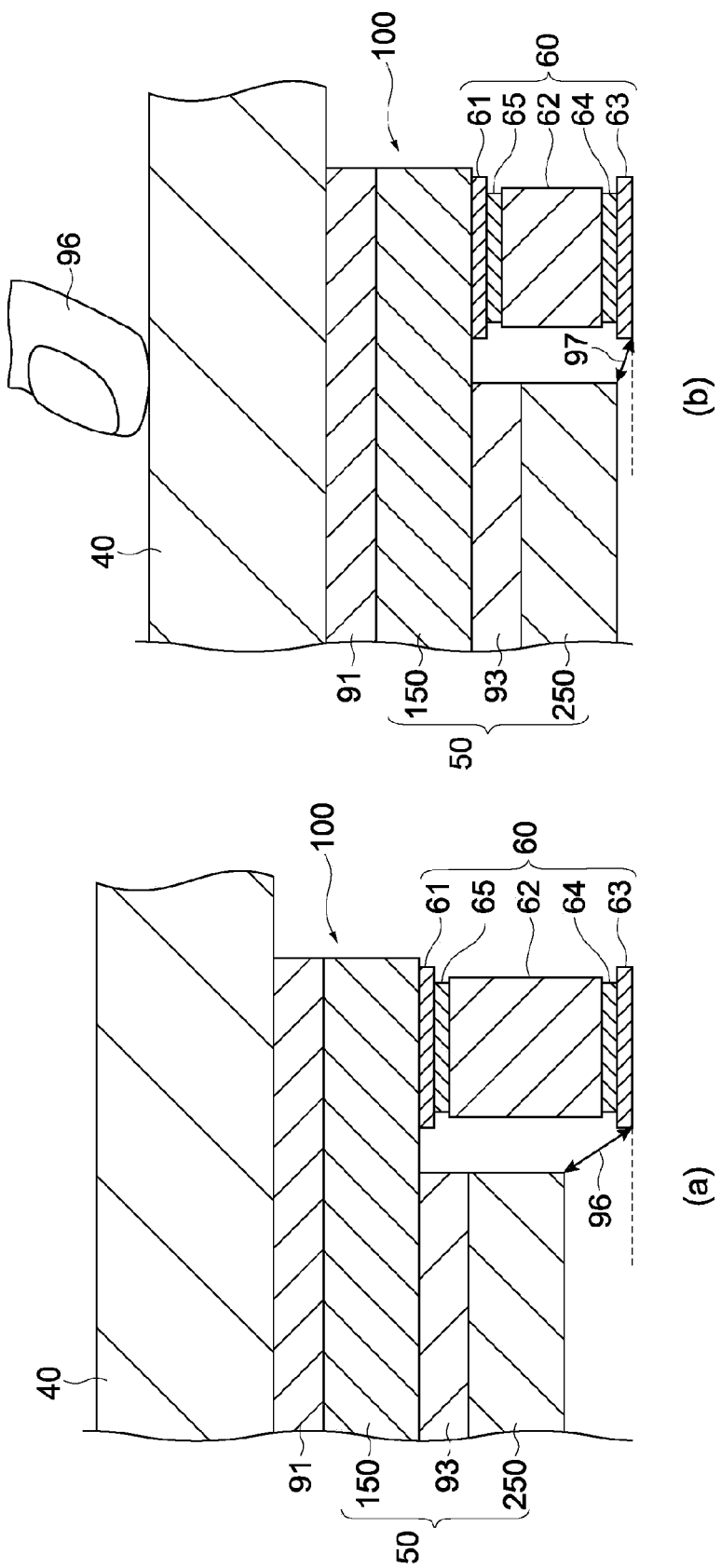
FIG. 11 Diagrams showing a positional relationship between the touch panel and a lower electrode due to the deformation of an elastic body of the sensor apparatus that is caused by a press.

Here, it is conceived that the lower electrode 63 is also formed on the touch panel 50, for example, on the Y electrode substrate 250, similarly to the upper electrodes 61. However, as shown in FIG. 11, distances 96 and 97 between the Y electrode substrate 250 and the lower electrode 63 differ due to the presence/absence of a press, which makes the connection structure complicated. Therefore, in this embodiment, the lower electrode 63 is formed on the casing 10. It should be noted that FIG. 11 are diagrams showing a positional relationship between the touch panel corresponding to FIG. 3 and the lower electrode due to the deformation of the elastic body of the sensor apparatus that is caused by the press, in which (a) shows a state before a press, and (b) shows a state at a time of press.

[Principle of Operation of Pressure-Sensitive Sensor]

Next, the principle of operation of the pressure-sensitive sensor 60 in this embodiment will be described with reference to FIGS. 5 and 6. In the pressure-sensitive sensor 60 of this embodiment, a capacitance is changed in accordance with a pressing force applied with a finger 96 in the lamination direction of the upper electrode 61, the elastic body 62, and the lower electrode 63 of the pressure-sensitive sensor 60. As shown in FIG. 5(b), when a pressing force is applied to the pressure-sensitive sensor 60 with the finger 96, the elastic body 62 constituting the pressure-sensitive sensor 60 is distorted such that a thickness thereof is reduced, and a capacitance between the upper electrode 61 and the lower electrode 63 is reduced.

As described above, the pressure-sensitive function is realized using the capacitance change between the electrodes 61 and 63 due to the deformation of the elastic body 62. As shown in FIG. 6, the pressure-sensitive sensor 60 has linear characteristics in which a capacitance change rate is substantially proportional to a pushing force, that is, a pressing force applied to the pressure-sensitive sensor 60. In this embodiment, a rectangular pulse is applied to the lower electrode 63, a signal obtained from the upper electrode is input to a computing circuit provided on the circuit board (not shown), and the capacitance change between the electrodes 61 and 63 can be detected. Then, from the capacitance change between the electrodes 61 and 63, it is possible to judge that an input determination operation by pressing the input operation surface 51 has been made.

The pressing force with respect to the input operation surface 51 based on the capacitance change of the pressure-sensitive sensor 60 is judged by a judgment unit (not shown). The judgment unit includes the computing circuit described above and can be structured as a part of a controller of the information processing apparatus 1. The judgment unit judges the pressing force based on capacitance changes detected by the pressure-sensitive sensors 60 arranged at the four corners of the touch panel 50. As will be described later, the judgment unit may judge the pressing force based on a combined value of the capacitance changes of the respective pressure-sensitive sensors 60. Accordingly, it is possible to highly precisely detect a pressing force without depending on a press position with respect to the input operation surface. In this case, for example, the judgment unit may judge the pressing force from the combined value of the capacitance changes, or judge the pressing force from an average value obtained by dividing the combined value by the number of pressure-sensitive sensors.

In the sensor apparatus 100, the finger 96 comes into indirect contact with the input operation surface 51 via the top plate 40, and accordingly the xy-plane coordinates are detected by the touch panel 50. Then, the input operation surface 51 is indirectly pressed with the finger 96 via the top plate 40, and accordingly a pressing force applied toward a direction perpendicular to the xy plane (z-axis direction) is detected by the pressure-sensitive sensor 60 and an input determination is judged. As a result, just an indirect contact of the finger 96 with the input operation surface 51 via the top plate 40 is not judged as determination, with the result that erroneous inputs can be reduced. In addition, since the finger 96 can be moved on the input operation surface 51 while indirectly coming into contact with the input operation surface 51 via the top plate 40, the operability is excellent.

Figure 17:
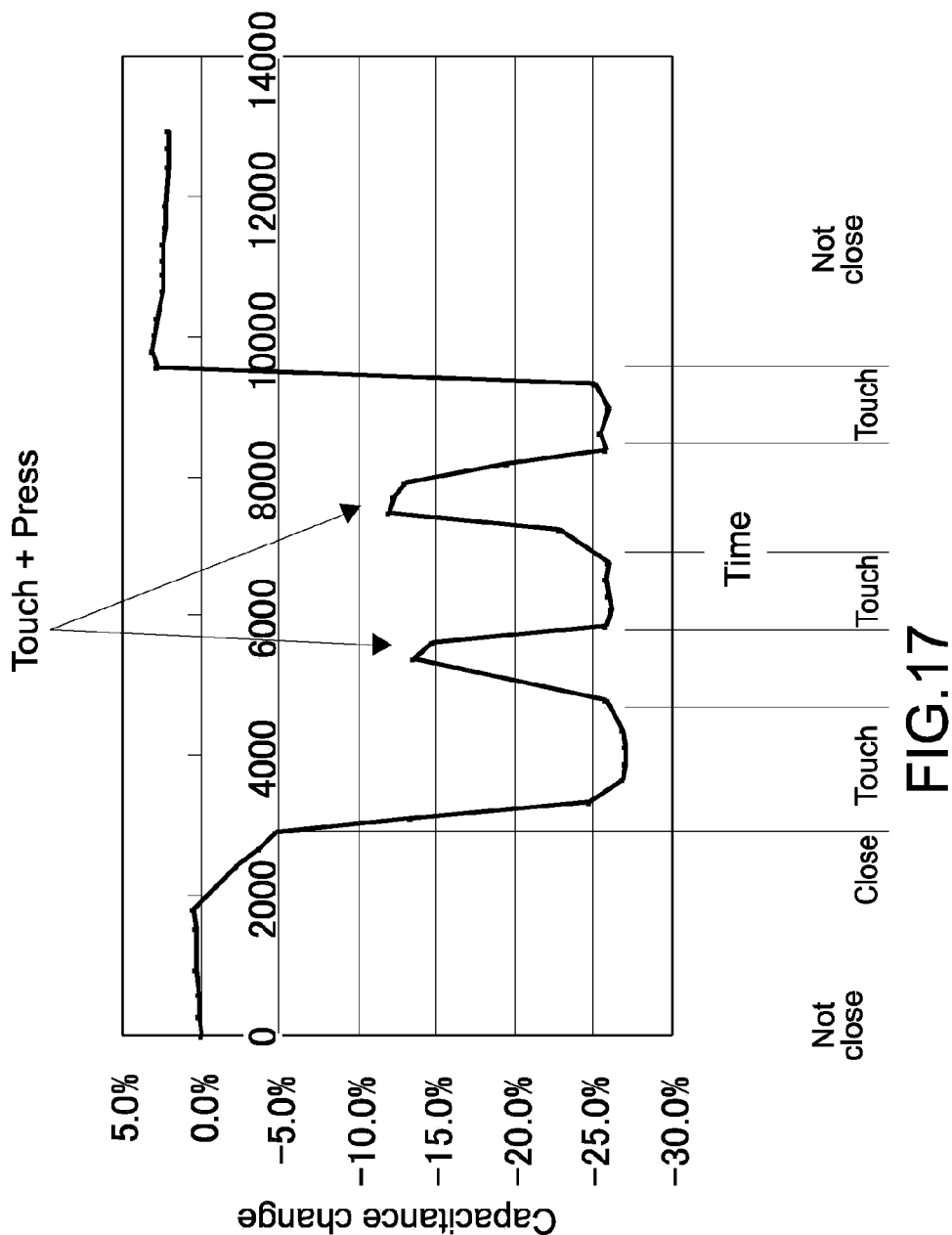
FIG. 17 A diagram showing a capacitance change at a time when an input operation is made to the sensor apparatus.

FIG. 17 shows a capacitance change at a time of an input operation of the sensor apparatus according to this embodiment. As shown in FIG. 17, in a state where a finger does not come close, a capacitance change is 0.0%. When the finger comes close to the input operation surface, the capacitance change is reduced to about −5.0%, and when the finger comes into contact with (touches) the input operation surface, the capacitance change is reduced abruptly. In a state where the finger comes into contact with the input operation surface, the capacitance change is about −27.0%. Then, when a determination operation of pressing the input operation surface with the finger is made, the capacitance change is increased to about −12 to −14%. From the history of such capacitance changes, a mere contact is distinguished from a determination, and a determination can be judged. It should be noted that the judgment method for determination is not limited to this. For example, after the movement of the finger stops on the input operation surface, if a capacitance change is increased with that position as a reference, it may be judged as a determination.

[Other Structure]

The sensor apparatus 100 in this embodiment can be used in, for example, portable terminals, and used as follows. In a case where a numerical keypad is displayed on the liquid crystal panel 30 of the information processing apparatus 1 as in the case of a keyboard of a personal computer, and an input is made with the finger 96 on the operator contact surface 41, the operation characteristics as described above are given. In this case, even when the finger 96 is moved without being separated from the operator contact surface 41, if a press is not added with the finger, it is not judged as an input determination. Therefore, there is not caused an erroneous input such as an input determination made by an intended key while the finger 96 is brought into contact with the operator contact surface 41.

Further, the sensor apparatus 100 can be applied to a substitution of a mouse operation for giving a command to the information processing apparatus, for example, to click and drag of an icon displayed on the liquid crystal panel. In this case, for example, an icon intended to be dragged is selected with the input operator, and the position of the icon is pressed, with the result that an operation corresponding to a click of a mouse is performed. Then, the input operator is moved in a state of coming into contact with the input operation surface while maintaining the pressed state, with the result that an operation corresponding to a drag is performed.

In FIG. 2, the FPC boards 81, 82, and 83 are connected and arranged so as to be positioned outside the frame-shaped elastic body 62. However, as shown in FIG. 7, the FPC boards 81, 82, and 83 (82 and 83 are not shown in the figure) may be arranged so as to be positioned inside the frame-shaped elastic body 62 (area surrounded by the frame). Accordingly, the connection of the FPC boards 81, 82, and 83 to the respective circuit boards (not shown) can be made from the inside of the frame-shaped elastic body 62, with the result that the sealing effect by the elastic body 62 is further improved.

Further, a seal may be formed separately from the elastic body 62. As a seal, an extendable member such as a frame-shaped sponge that two-dimensionally surrounds the sensor apparatus 100 can be provided between the top plate 40 and the casing 10. Accordingly, the sponge can prevent dust or the like from entering a gap from the outside more reliably.

Further, in this embodiment, the lower electrode is provided to the casing, but it may be possible to bond a film on which a lower electrode is formed, to the elastic body, and bond the film and the casing by a bonding layer. Hereinafter, description will be given with reference to FIG. 21. The structures different from those in the above embodiment will be mainly described, the structures that are the same as those in the above embodiment will be denoted by the same reference symbols, and description thereof will be omitted or simplified.

Figure 21:
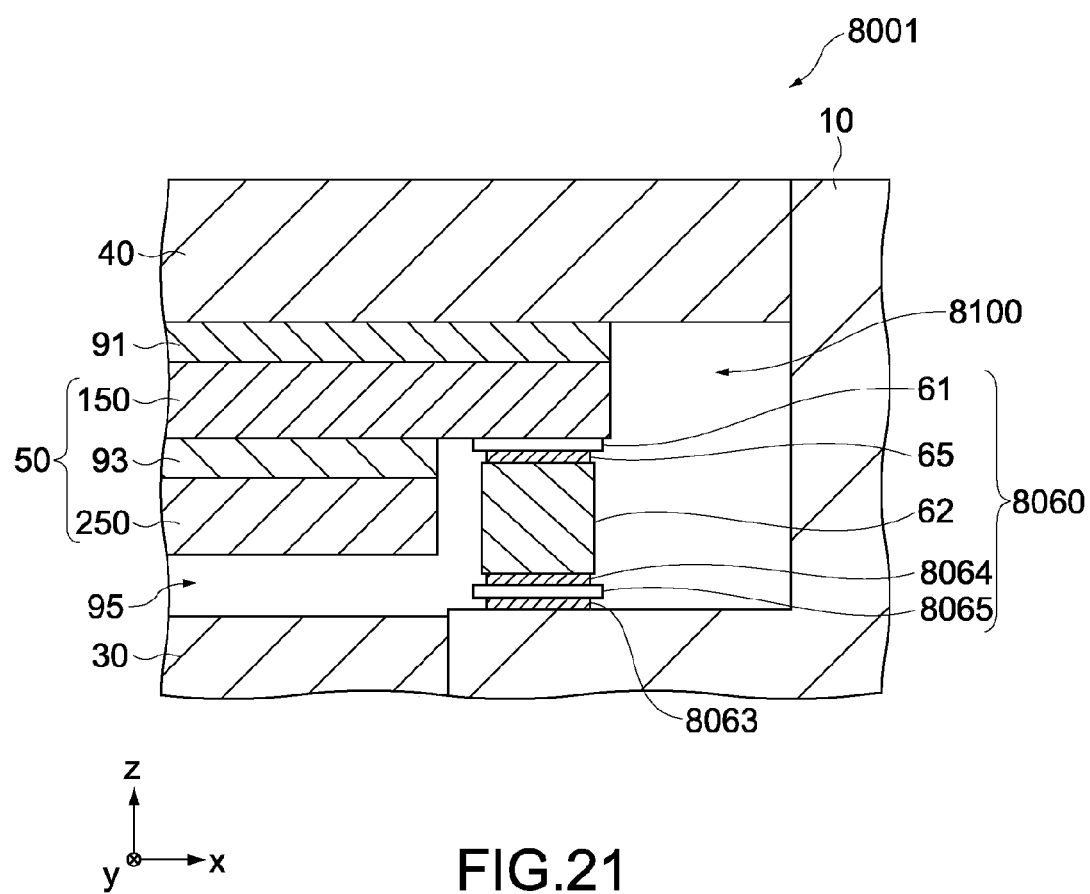
FIG. 21 A schematic partial cross-sectional view of an information processing apparatus according to a modified example.

FIG. 21 is a schematic partial cross-sectional view of an information processing apparatus 8001 including a sensor apparatus. In FIG. 21, the illustration of a liquid crystal panel and a backlight is omitted.

The information processing apparatus 8001 includes a top plate 40, a sensor apparatus 8100, a liquid crystal panel 30, a backlight, and a casing 10 that accommodates those components. The sensor apparatus 8100 includes a touch panel 50 and a pressure-sensitive sensor 8060, which are bonded and fixed to each other. A total of four pressure-sensitive sensors 8060 are arranged one by one at four corners of a frame portion of the touch panel 50 having a flat rectangular shape. Each of the pressure-sensitive sensors 8060 is fixedly arranged on the casing 10. The pressure-sensitive sensor 8060 includes an elastic body 62, an upper electrode 61 and a lower electrode 8065 serving as a second electrode, which are arranged so as to interpose the elastic body 62 therebetween, a bonding layer 65 that bonds the elastic body 62 and the upper electrodes 61, and a bonding layer 8064 that bonds the elastic body 62 and the lower electrode 8065. The lower electrode 8065 is bonded to the elastic body 62 in a state of being formed on a transparent film, and the illustration of the transparent film is omitted. The shape of the lower electrode 8065 may be formed in a frame shape, or an island shape corresponding to each of the upper electrodes 61. The lower electrode 8065 is bonded and fixed to the casing 10 via a bonding layer 8063. In this way, the lower electrode may not be formed on the casing, and as compared to the case where the lower electrode is provided to the casing, the connection of the lower electrode and the circuit board is made easy.

Further, in addition to the structure shown in FIG. 21, it may be possible to form the upper electrode not on the touch panel but on the transparent film, and bond this upper electrode to the elastic body. In this case, it is possible to form the touch panel and the pressure-sensitive sensor separately from each other.

Second Embodiment

Next, a second embodiment will be described with reference to FIGS. 1, 4, and 8. In the first embodiment, the elastic body 26 has a frame shape. On the other hand, this embodiment is largely different in that the elastic bodies are formed in an island shape separately for each of pressure-sensitive sensors. Hereinafter, the structures different from those in the first embodiment will be mainly described, and the structures that are the same as those in the first embodiment will be denoted by the same reference symbols and description thereof will be omitted or simplified.

FIG. 1 is a schematic cross-sectional view of an information processing apparatus including a sensor apparatus. FIG. 4 is an enlarged view of an area surrounded by the circle A of FIG. 1. FIG. 8 is a schematic exploded perspective view of a sensor apparatus incorporated in the information processing apparatus shown in FIG. 1. In FIG. 8, the illustration of an electrode pattern or the like formed on a Y electrode substrate 250 is omitted.

Figure 8:
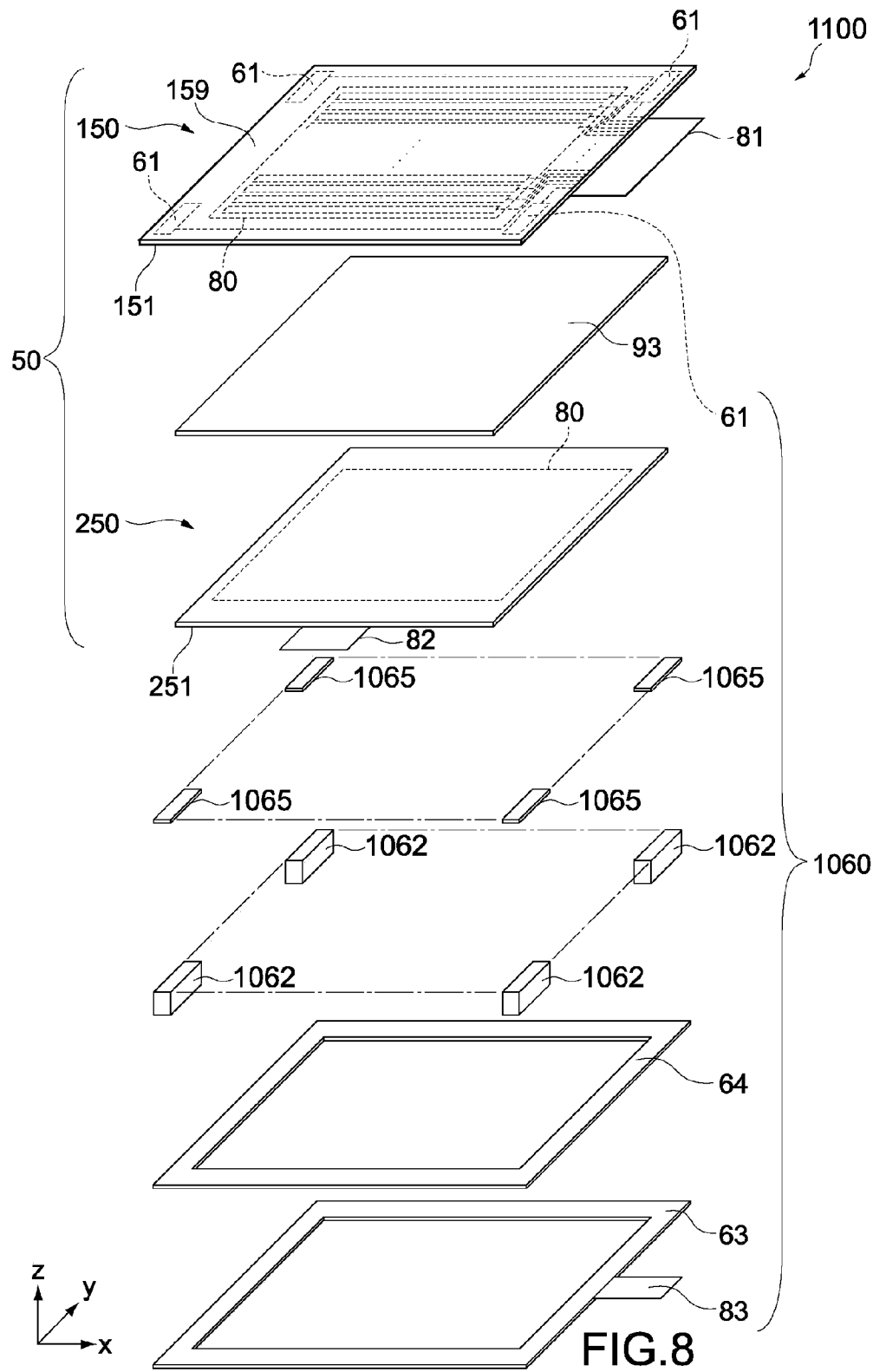
FIG. 8 A schematic exploded perspective view of a sensor apparatus incorporated in the information processing apparatus shown in FIG. 1 according to the second embodiment.

As shown in FIGS. 1, 4, and 8, an information processing apparatus 1001 with a touch panel according to a second embodiment includes a top plate 40, a sensor apparatus 1100, a liquid crystal panel 30, a backlight 20, and a casing 10 that accommodates those above.

The sensor apparatus 1100 includes a touch panel 50 and a pressure-sensitive sensor 1060, which are bonded and fixed to each other. A total of four pressure-sensitive sensors 1060 are arranged one by one at four corners of a frame portion of a second surface 52 of the touch panel 50. The pressure-sensitive sensor 1060 constituting a part of the sensor apparatus 1100 is fixedly arranged on the casing 10. When the sensor apparatus 1100 is pressed in a direction perpendicular to the operator contact surface 41 (z-axis direction in the figures), an elastic body 1062 of the pressure-sensitive sensor 1060 is deformed so as to be contracted, and the top plate 40 and the touch panel 50 to which the pressure-sensitive sensor 1060 is bonded and fixed are moved in the pressing direction at the same time.

The pressure-sensitive sensor 1060 includes the elastic body 1062, an upper electrode 61 and a lower electrode 63 that are arranged so as to interpose the elastic body 1062 therebetween, a bonding layer 1065 that bonds and fixes the elastic body 1062 and the upper electrode 61, and a bonding layer 64 that bonds and fixes the elastic body 1062 and the lower electrode 63. For the elastic body 1062, a material that is the same as that of the elastic body 62 in the first embodiment can be used. Four elastic bodies 1062 are provided correspondingly to the four first electrodes 61 arranged on the frame portion of the touch panel 50. In addition, the four bonding layers 1065 that bond the Y electrode substrate 250 and the elastic bodies 1062 are separately provided correspondingly to the elastic bodies 1062. It should be noted that the bonding layer 1065 is provided for each pressure-sensitive sensor 60, but as in the first embodiment, the structure in which the bonding layer 65 is provided in a frame shape and the four pressure-sensitive sensors 60 share one bonding layer 65 may be possible.

In this embodiment, since the elastic body is not provided in a frame shape, along with the movement of the sensor apparatus 110 in the z-axis direction due to the press at a time of an input operation, dust or the like is liable to enter the gap 95. In this case, for example, an extendable member such as a frame-shaped sponge that two-dimensionally surrounds the sensor apparatus 1100 may be provided as a seal, for example, between the top plate 40 and the casing 10. Accordingly, the sponge can prevent dust or the like from entering the gap from the outside, and accordingly the display characteristics are not affected.

Third Embodiment

Next, a third embodiment will be described with reference to FIGS. 1, 4, 9, 10, and 12. The third embodiment is largely different from the first and second embodiments in that an electrode structure of a pressure-sensitive sensor is different. Hereinafter, the structures different from those in the embodiments described above will be mainly described, and the structures that are the same as those in the embodiments described above will be denoted by the same reference symbols and description thereof will be omitted or simplified.

Figure 9:
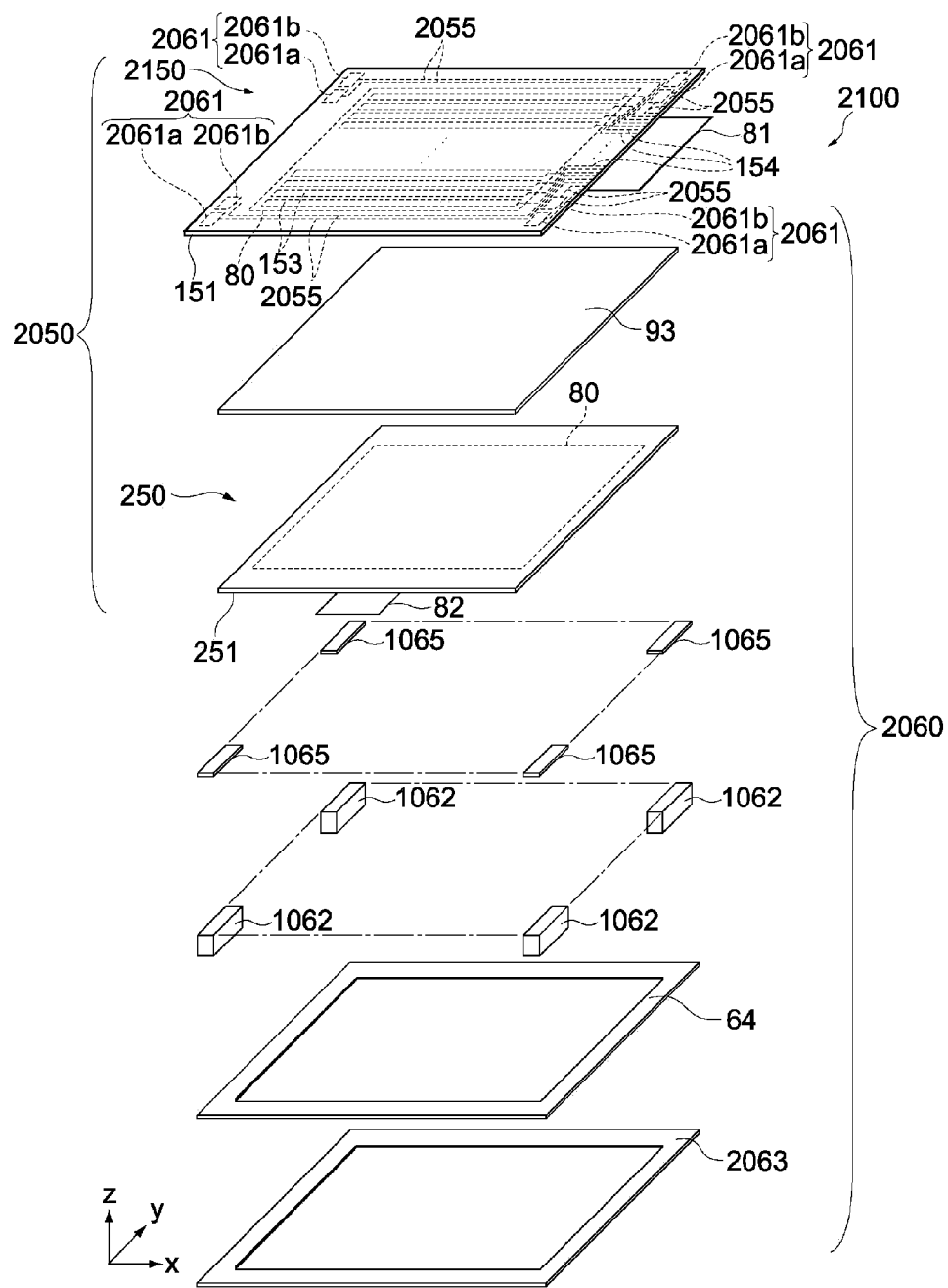
FIG. 9 A schematic exploded perspective view of a sensor apparatus incorporated in the information processing apparatus shown in FIG. 1 according to the third embodiment.
Figure 10:
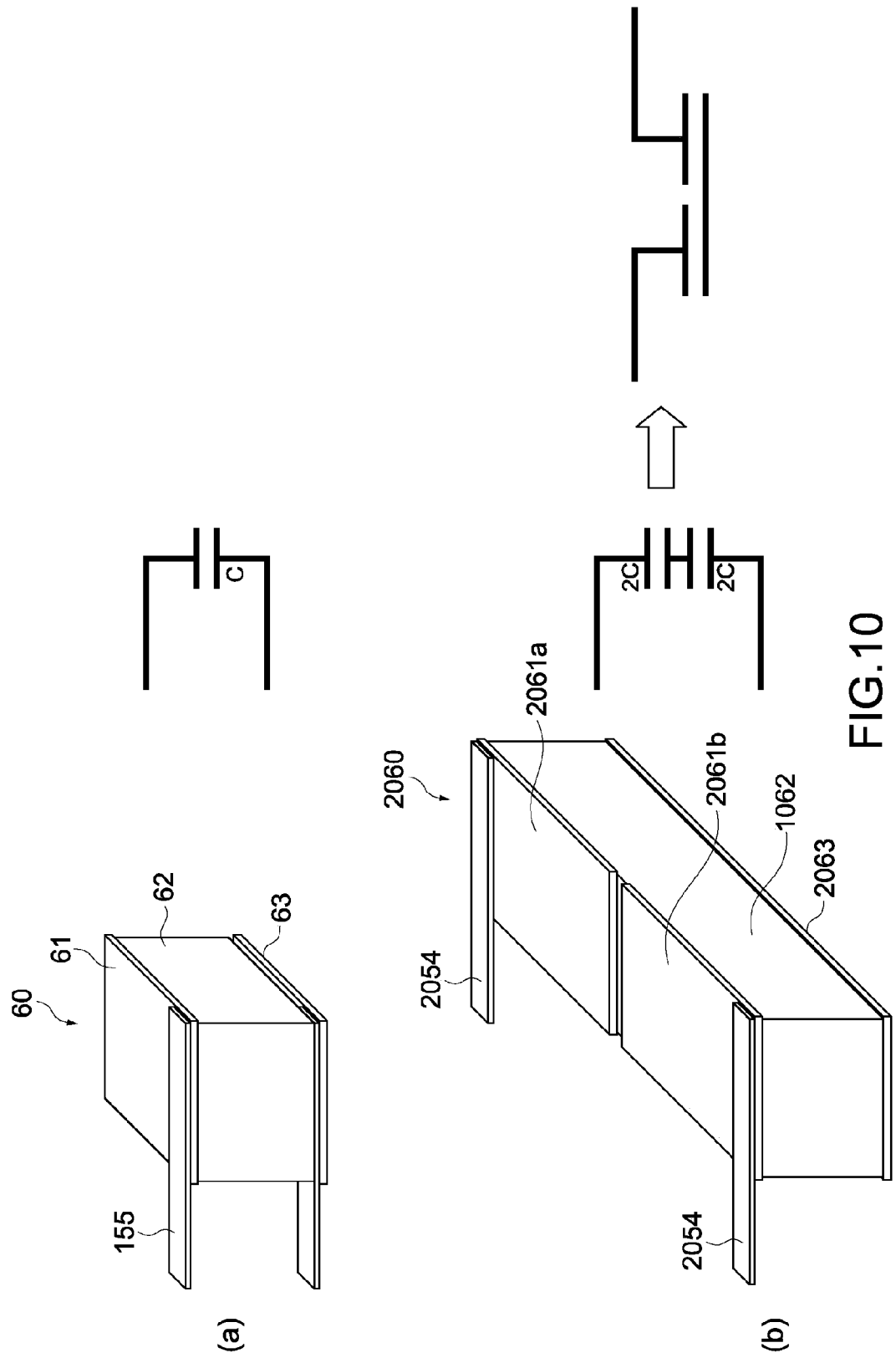
FIG. 10 Perspective views of the pressure-sensitive sensors of the first and third embodiments, and equivalent circuit diagrams thereof.
Figure 12:
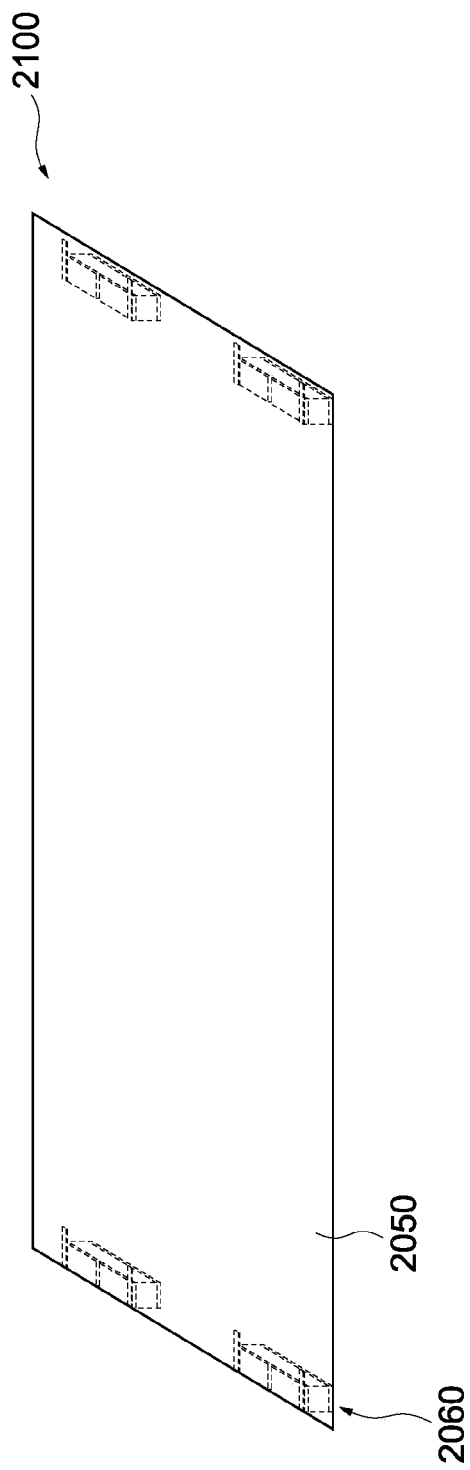
FIG. 12 A schematic perspective view of the sensor apparatus according to the third embodiment.

FIG. 1 is a schematic cross-sectional view of an information processing apparatus 2001 including a sensor apparatus. FIG. 4 is an enlarged view of an area surrounded by the circle A of FIG. 1. FIG. 9 is a schematic exploded perspective view of a sensor apparatus 2100 incorporated in the information processing apparatus 2001 shown in FIG. 1. In FIG. 9, the illustration of an electrode pattern or the like formed on a Y electrode substrate 250 is omitted. FIG. 10(*a*) is a perspective view of a pressure-sensitive sensor 60 constituting a part of the sensor apparatus 100 of the first embodiment and an equivalent circuit diagram thereof. FIG. 10(*b*) is a perspective view of a pressure-sensitive sensor 2060 constituting a part of the sensor apparatus 2100 of the third embodiment and an equivalent circuit diagram thereof. FIG. 12 is a schematic perspective view of the sensor apparatus 2100 according to this embodiment.

As shown in the figures, the information processing apparatus 2001 with a touch panel according to the third embodiment includes a top plate 40, the sensor apparatus 2100, a liquid crystal panel 30, a backlight 20, and a casing 10 that accommodates those above.

The sensor apparatus 2100 includes a touch panel 2050 and a pressure-sensitive sensor 2060, which are bonded and fixed to each other. A total of four pressure-sensitive sensors 2060 are arranged one by one at four corners of a frame portion of a surface of a touch panel 2050 on the liquid crystal panel 30 side. The pressure-sensitive sensor 2060 constituting a part of the sensor apparatus 2100 is fixedly arranged on the casing 10. When the sensor apparatus 2100 is pressed in a direction perpendicular to the operator contact surface 41 (z-axis direction in the figures), an elastic body 2062 of the pressure-sensitive sensor 2060 is deformed so as to be contracted, and the top plate 40 and the touch panel 2050 to which the pressure-sensitive sensor 2060 is bonded and fixed are moved in the pressing direction at the same time.

The pressure-sensitive sensor 2060 includes the elastic body 1062, an upper electrode 2061 serving as a first electrode, and a lower electrode 2063 serving as a second electrode, the upper electrode 2061 and the lower electrode 2063 being arranged so as to interpose the elastic body 1062 therebetween. In addition, the pressure-sensitive sensor 2060 includes a bonding layer 1065 that bonds and fixes the elastic body 1062 and the upper electrode 2061, and a bonding layer 64 that bonds and fixes the elastic body 1062 and the lower electrode 2063.

The touch panel 2050 is structured by sequentially laminating an X electrode substrate 2150 and a Y electrode substrate 250 and bonding them to each other by a bonding layer 93. An area in which an X transparent electrode pattern 153 for detection formed on the X electrode substrate 2150 and a Y transparent electrode pattern 252 for detection formed on the Y electrode substrate 250 two-dimensionally overlap each other becomes an xy-plane coordinate detection area 80. The pressure-sensitive sensor 2060 is arranged in an area (frame portion) outside the xy-plane coordinate detection area 80 of the touch panel 2050.

The X electrode substrate 2150 includes a transparent polyimide substrate 151, the X transparent electrode pattern 153 formed on the substrate 151, the upper electrodes 2061 serving as first electrodes, wires 154 electrically connected to the X transparent electrode pattern 153, and lead wires 2055 electrically connected to the upper electrodes 2061. Each of the upper electrodes 2061 constitutes a part of the pressure-sensitive sensor 60. The upper electrodes 2061 are formed simultaneously with the X transparent electrode pattern 153, and are formed of ITO. Each of the upper electrodes 2061 is constituted of a first upper electrode portion 2061*a* and a second upper electrode portion 2061*b* that are electrically independent of each other, and the upper electrode 2061 is provided for each of the pressure-sensitive sensors 2060. The lead wires 2055 are wires for electrically connecting the upper electrodes 2061 and a circuit board (not shown) via a FPC board 81, and are collectively formed on the same side on which the wires 154 are collected. The wires 154 and the lead wires 2055 are formed by printing of Ag (silver), for example.

In this embodiment, the lower electrode 2063 arranged on the casing 10 is in a floating state.

As shown in FIG. 10(*a*), in the pressure-sensitive sensor 60 in the first embodiment, a capacitance of the elastic body is detected from a potential difference between the upper electrode 61 and the lower electrode 63. On the other hand, the pressure-sensitive sensor 2060 in this embodiment includes the upper electrode 2061 and the lower electrode 2063, and the upper electrode 2061 is constituted of the first upper electrode portion 2061*a* and the second upper electrode portion 2061*b* that are electrically independent of each other. The first upper electrode portion 2061*a* and the second upper electrode portion 2061*b* are each opposed to the lower electrode 2063 with the elastic body 1062 being interposed therebetween. Accordingly, as shown in FIG. 10(*b*), a capacitance of the elastic body 2062 can be detected from the first upper electrode portion 2061*a* and the second upper electrode portion 2061*b*. Accordingly, the electrodes for detecting a capacitance of the elastic body can be formed on the same substrate and can be collectively connected to the circuit board via the same wiring substrate, with the result that the wiring structure can be simplified.

Fourth Embodiment

Next, a fourth embodiment will be described with reference to FIG. 13. In the third embodiment, the lower electrode is arranged on the casing 10 and is set as a floating potential. On the other hand, in the fourth embodiment, a first shield electrode is provided on the casing 10, and a dielectric layer is provided between the first shield electrode and the lower electrode. Hereinafter, the structures different from those in the third embodiment will be mainly described, and the structures that are the same as those in the embodiments described above will be denoted by the same reference symbols and description thereof will be omitted or simplified.

Figure 13:
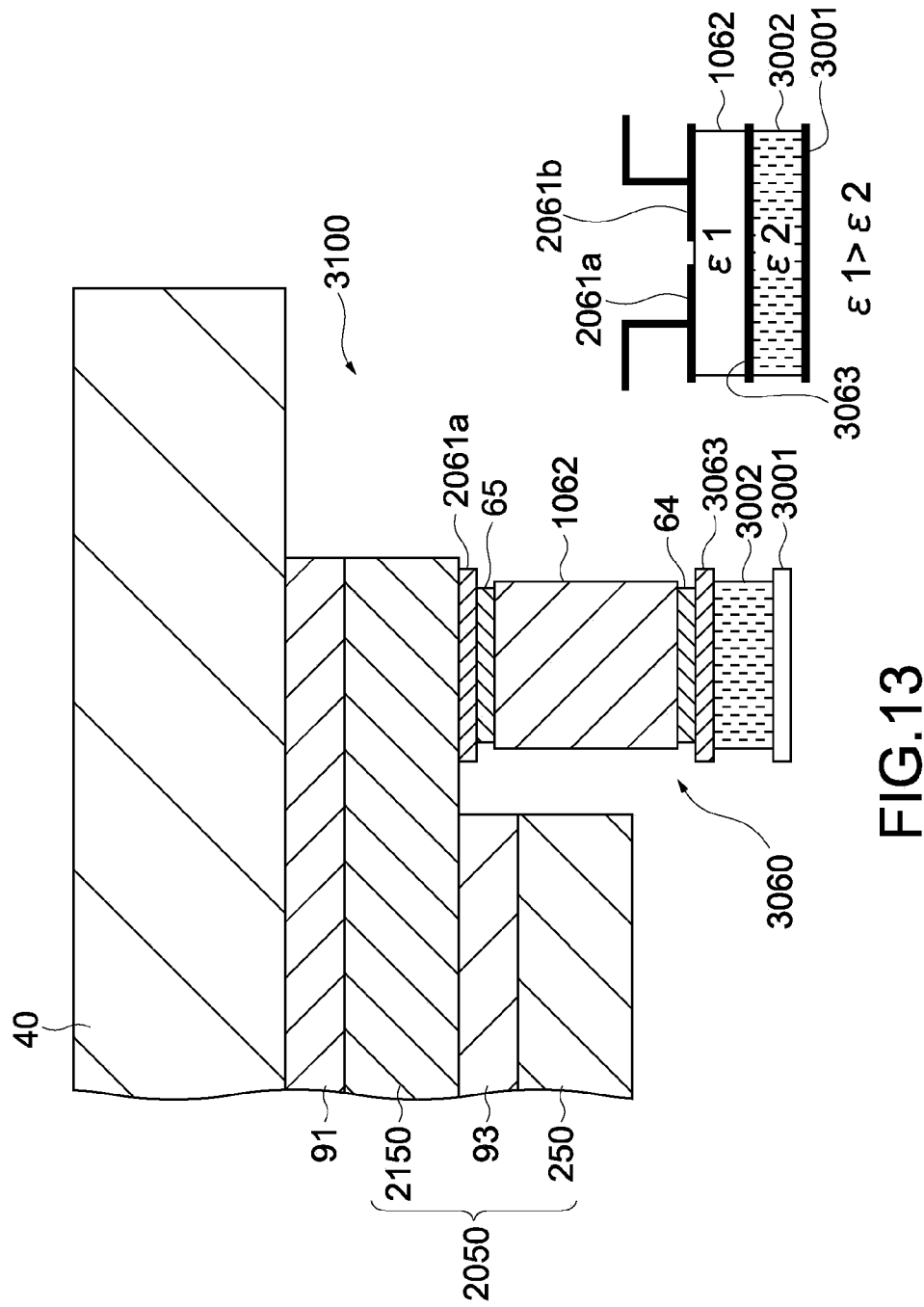
FIG. 13 A schematic partial cross-sectional view of an information processing apparatus according to a fourth embodiment.

FIG. 13 is a schematic partial cross-sectional view of an information processing apparatus including a sensor apparatus. In FIG. 13, the illustration of a liquid crystal panel, a backlight, and a casing is omitted.

As shown in FIG. 13, the information processing apparatus according to the third embodiment includes a top plate 40, a sensor apparatus 3100, A liquid crystal panel as a display panel, a backlight 20, and a casing that accommodates those above.

The sensor apparatus 3100 includes a touch panel 2050 and a pressure-sensitive sensor 3060, which are bonded and fixed to each other. The pressure-sensitive sensor 3060 includes an elastic body 1062, an upper electrode 2061 serving as a first electrode, and a lower electrode 3063 serving as a second electrode, the upper electrode 2061 and the lower electrode 3063 being arranged so as to interpose the elastic body 1062 therebetween. The lower electrode 3063 is formed by printing on a transparent film (not shown), for example, and is fixed to the elastic body 1062 via a bonding layer 64.

On the casing, a first shield electrode 3001 formed of a conductor layer such as a copper foil is formed and arranged in a frame shape. In addition, on the first shield electrode 3001, a first dielectric layer 3002 is arranged in a frame shape. The first shield electrode 3001 and the first dielectric layer 3002, and the first dielectric layer 3002 and the lower electrode 3063 are bonded and fixed to each other by respective bonding layers (not shown). The first dielectric layer 3002 has a dielectric constant of $\in2$, which is smaller than a dielectric constant $\in1$ of the elastic body 1062. In this embodiment, the first dielectric layer 3002 is formed of the same material as that of the elastic body 1062, and has a porous form so as to reduce an effective dielectric constant thereof. The first shield electrode 3001 is connected to a ground potential.

In this embodiment, the pressure-sensitive sensor 3060 is constituted of the elastic body 1062, the upper electrode 2061, and the lower electrode 3063, the upper electrode 2061 and the lower electrode 3063 being arranged so as to interpose the elastic body 1062 therebetween. The upper electrode 2061 is constituted of a first upper electrode portion 2061a and a second upper electrode portion 2061b that are electrically independent of each other. In addition, the lower electrode 3063 is set in a floating state, with the result that a capacitance can be detected by the first upper electrode portion 2061a and the second upper electrode portion 2061b. Then, in this embodiment, the first dielectric layer 3002 having a lower dielectric constant than that of the elastic body 1062, and the first shield electrode 3001 are provided, with the result that the lower electrode 3063 can be kept in a stable floating state without being affected from the outside. Further, since the dielectric constant $\in2$ of the first dielectric layer 3002 is smaller than the dielectric constant $\in1$ of the elastic body 1062, a capacitance between the lower electrode 3063 and the first shield electrode 3001 can be made low, and the influence on the sensitivity of the pressure-sensitive sensor 3060 can be minimized.

Fifth Embodiment

Next, a fifth embodiment will be described with reference to FIG. 14. In the fifth embodiment, in addition to the structure of the fourth embodiment, a second shield electrode and a second dielectric layer that correspond to an upper electrode are provided. Hereinafter, the structures different from those in the fourth embodiment will be mainly described, and the structures that are the same as those in the embodiments described above will be denoted by the same reference symbols and description thereof will be omitted or simplified.

Figure 14:
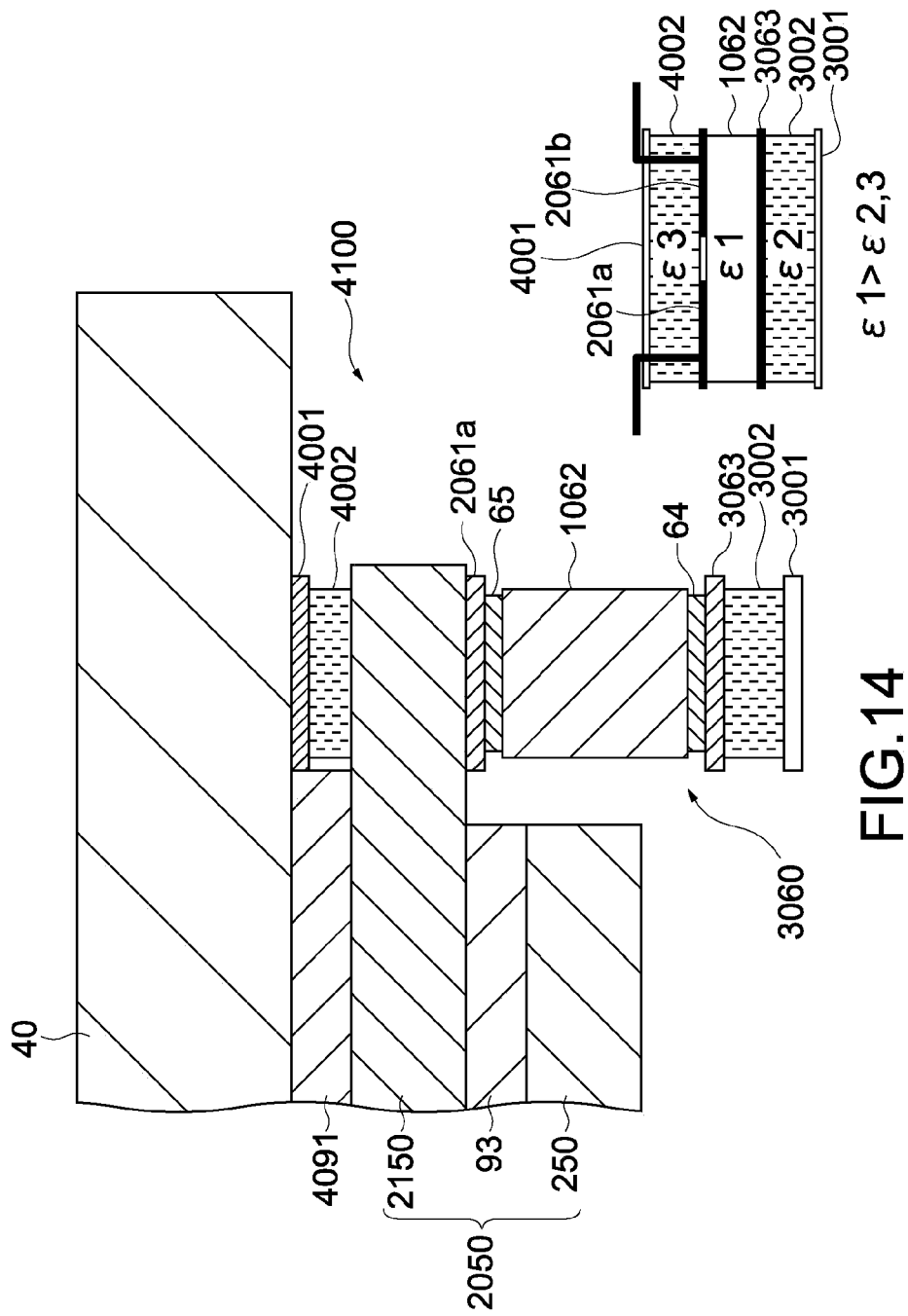
FIG. 14 A schematic partial cross-sectional view of an information processing apparatus according to a fifth embodiment.

FIG. 14 is a schematic partial cross-sectional view of an information processing apparatus including a sensor apparatus. In FIG. 14, the illustration of a liquid crystal panel, a backlight, and a casing is omitted.

As shown in FIG. 14, the information processing apparatus according to the fifth embodiment includes a top plate 40, a sensor apparatus 4100, a liquid crystal panel, a backlight, and a casing that accommodates those above. The sensor apparatus 4100 includes a touch panel 2050 and a pressure-sensitive sensor 3060, which are bonded and fixed to each other. A bonding layer 4091 that bonds the top plate 40 and the sensor apparatus 4100 is provided in a range smaller than the outer shape of the sensor apparatus 4100. In an area between the top plate 40 and the sensor apparatus 4100, in which the bonding layer 4091 is not provided, a second shield electrode 4001 and a second dielectric layer 4002 are provided correspondingly to the upper electrode 2061. The second shield electrode 4001 is formed of a conductor layer such as a copper foil, and is arranged on a surface opposite to the input operation surface of the top plate 40. The second dielectric layer 4002 is provided between the sensor apparatus 4100 and the second shield electrode 4001. The second dielectric layer 4002 has a dielectric constant $\in3$, which is also smaller than the dielectric constant $\in1$ of the elastic body 1062. In this embodiment, the second dielectric layer 4002 is constituted of the same material as that of the elastic body 1062, and has a porous form so as to reduce an effective dielectric constant thereof.

As described above, in this embodiment, the second dielectric layer 4002 and the second shield electrode 4001 are provided correspondingly to the upper electrode 2061, with the result that an erroneous detection of the pressure-sensitive sensor 3060 due to electromagnetic noises can be prevented. Further, the dielectric constant $\in3$ of the second dielectric layer 4002 is made smaller than the dielectric constant $\in1$ of the elastic body 1062, with the result that a capacitance change caused by a press can be detected by the pressure-sensitive sensor 3060, without being affected by the capacitance change of the upper electrode, which is cased when a finger comes into contact with the touch panel 50.

Sixth Embodiment

Next, a sixth embodiment will be described with reference to FIG. 15. As compared to the fifth embodiment, the sixth embodiment has in common that the first shield electrode and the first dielectric layer are provided correspondingly to the lower electrode, and that the second shield electrode and the second dielectric layer are provided correspondingly to the upper electrode. However, the sixth embodiment is different from the fifth embodiment in the arrangement of the second shield electrode, the second dielectric layer, and the first electrode. Hereinafter, the structures different from those in the fifth embodiment will be mainly described, and the structures that are the same as those in the embodiments described above will be denoted by the same reference symbols and description thereof will be omitted or simplified.

Figure 15:
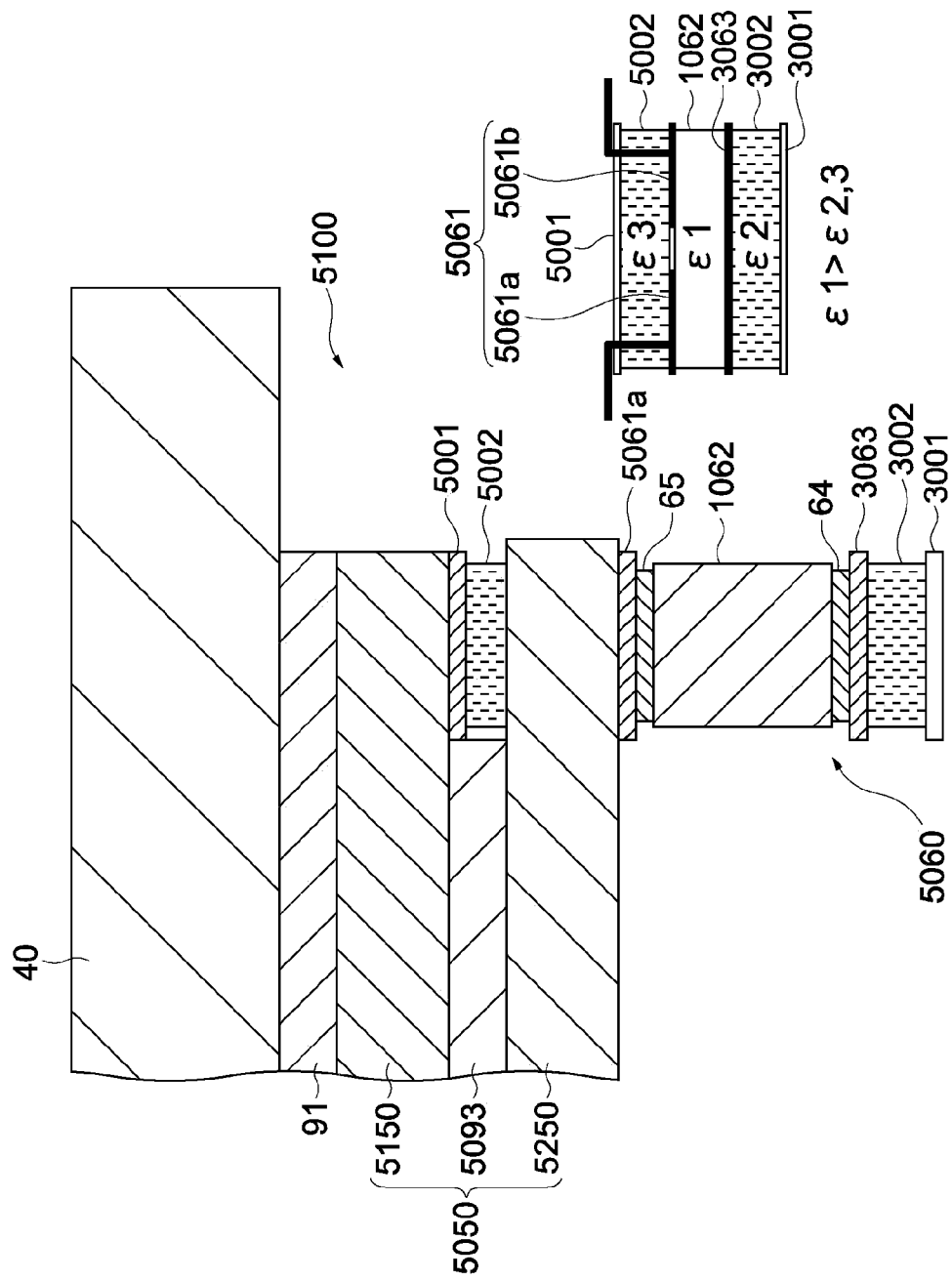
FIG. 15 A schematic partial cross-sectional view of an information processing apparatus according to a sixth embodiment.

FIG. 15 is a schematic partial cross-sectional view of an information processing apparatus including a sensor apparatus. In FIG. 15, the illustration of a liquid crystal panel, a backlight, and a casing is omitted.

As shown in FIG. 15, the information processing apparatus according to the sixth embodiment includes a top plate 40, a sensor apparatus 5100, a liquid crystal panel, a backlight, and a casing that accommodates those above. The sensor apparatus 5100 includes a touch panel 5050 and a pressure-sensitive sensor 5060, which are bonded and fixed to each other. The pressure-sensitive sensor 5060 includes an elastic body 1062, an upper electrode 5061 serving as a first electrode, and a lower electrode 3063 serving as a second electrode, the upper electrode 5061 and the lower electrode 3063 being arranged so as to interpose the elastic body 1062 therebetween. In addition, the pressure-sensitive sensor 5060 includes a bonding layer 65 that bonds and fixes the elastic body 1062 and the upper electrode 5061, and a bonding layer 64 that bonds and fixes the elastic body 1062 and the lower electrode 3063. The upper electrodes 5061 is constituted of a first upper electrode 5061a and a second upper electrode 5061b that are electrically independent of each other, and the principle of operation of the pressure-sensitive sensor according to this embodiment is the same as that in the third embodiment.

An X electrode substrate 5150 and a Y electrode substrate 5250 each have an outer shape having substantially the same size. The X electrode substrate 5150 and the Y electrode substrate 5250 are bonded and fixed to each other by a bonding layer 5093 provided in an area smaller than the outer shapes of those substrates. The X electrode substrate 5150 has the structure obtained by removing the upper electrode 2061 of the X electrode substrate 2150 shown in the third embodiment and adding a second shield electrode 5001 corresponding to the pressure-sensitive sensor 5060. The Y electrode substrate 5250 has the structure obtained by arranging an upper electrode 5061 simultaneously formed with the Y transparent electrode pattern, on the Y electrode substrate 250 shown in the first embodiment. A pattern shape of the upper electrode 5061 is the same as that of the upper electrode 2061 shown in the third embodiment. In an area between the X electrode substrate 5150 and the Y electrode substrate 5250, in which the bonding layer 5093 is not provided, the second shield electrode 5001 and the second dielectric layer 5002 corresponding to the upper electrode 5061 are provided. The second shield electrode 5001 is formed simultaneously with the X transparent electrode pattern provided on the X electrode substrate 5150. The second dielectric layer 5002 is provided between the second shield electrode 5001 and the Y electrode substrate 5250. The second dielectric layer 5002 also has a dielectric constant $\in 3$, which is smaller than the dielectric constant $\in 1$ of the elastic body 1062. The second dielectric layer 5002 has a porous form so as to reduce an effective dielectric constant thereof.

As described above, the upper electrode of the pressure-sensitive sensor may be provided to the Y electrode substrate of the touch panel. Further, the second shield electrode corresponding to the upper electrode may be provided to the X electrode substrate of the touch panel. Accordingly, a capacitance change caused by a press can be detected by the pressure-sensitive sensor 5060, without being affected by the capacitance change of the upper electrode, which is cased when the touch panel 5050 is touched.

In the embodiments described above, an input judgment is performed using the pressure-sensitive sensors. In a case where a plurality of pressure-sensitive sensors are used in this input judgment, a pressing force can be judged by combining capacitance changes detected by the respective pressure-sensitive sensors. Hereinafter, description is given with reference to FIG. 16.

Figure 16:
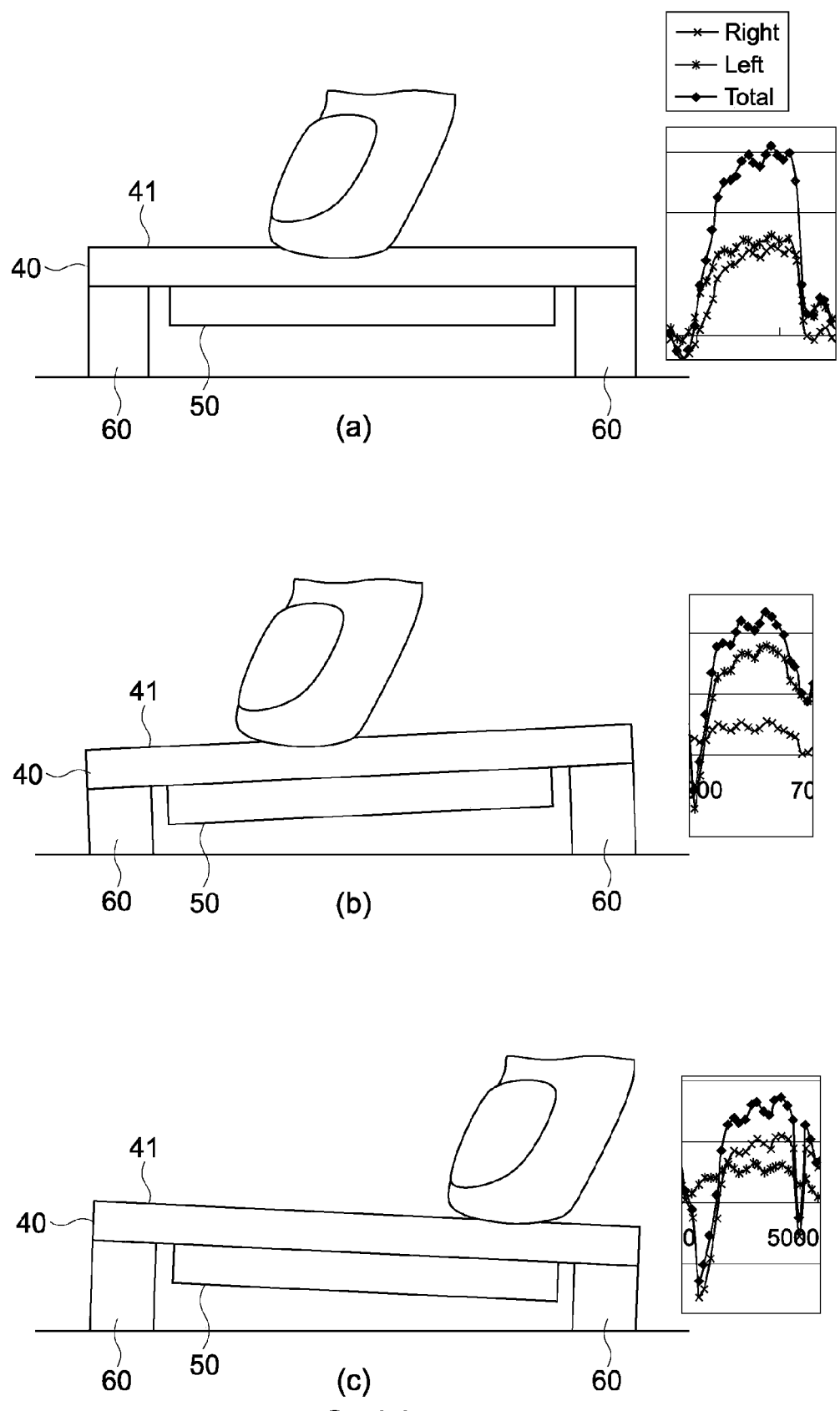
FIG. 16 Schematic cross-sectional views of the sensor apparatus and graphs showing a displacement amount detected by the sensor apparatus.

FIG. 16 are schematic cross-sectional views of a sensor apparatus and graphs showing a displacement amount. In FIG. 16, the pressure-sensitive sensors 60 are provided one by one at both opposed end portions of the operator contact surface 41, and the operator contact surface 41 is pressed by the same force while an input point is changed. In the graphs, the horizontal axis represents a time, and the vertical axis represents a capacitance. In the figures, capacitances detected by the two pressure-sensitive sensors 60 and a combination of those capacitances are graphed.

FIG. 16(a) shows a case where the center portion of the operator contact surface 41 is pressed with a finger. In the graph, out of three line graphs, a line graph having the highest peak is a graph formed by combining capacitances detected by the two pressure-sensitive sensors 60. Out of the three line graphs, a line graph having the second highest peak is a graph formed based on a capacitance detected by the pressure-sensitive sensor 60 positioned on the left side. Out of the three line graphs, a line graph having the lowest peak is a graph formed based on a capacitance detected by the pressure-sensitive sensor 60 positioned on the right side.

FIG. 16(b) shows a case where the left side from the center portion of the operator contact surface 41 is pressed with a finger. In the graph, out of three line graphs, a line graph having the highest peak is a graph formed by combining capacitances detected by the two pressure-sensitive sensors 60. Out of the three line graphs, a line graph having the second highest peak is a graph formed based on a capacitance detected by the pressure-sensitive sensor 60 positioned on the left side. Out of the three line graphs, a line graph having the lowest peak is a graph formed based on a capacitance detected by the pressure-sensitive sensor 60 positioned on the right side.

FIG. 16(c) shows a case where the right side from the center portion of the operator contact surface 41 is pressed with a finger. In the graph, out of three line graphs, a line graph having the highest peak is a graph formed by combining capacitances detected by the two pressure-sensitive sensors 60. Out of the three line graphs, a line graph having the second highest peak is a graph formed based on a capacitance detected by the pressure-sensitive sensor 60 positioned on the right side. Out of the three line graphs, a line graph having the lowest peak is a graph formed based on a capacitance detected by the pressure-sensitive sensor 60 positioned on the left side.

As found from the graphs shown in the figures, the graphs of a combined value of capacitances detected by the two pressure-sensitive sensors each have substantially the same form in each of the figures. Specifically, capacitances different between the pressure-sensitive sensors are detected depending on an input position, but a combined value thereof is substantially proportional to the pressing force. The pressure-sensitive sensor in this embodiment is not used for position detection of xy coordinates, and merely detects a pressing force. Therefore, it is unnecessary to see a capacitance change for each pressure-sensitive sensor. Accordingly, in a case where a plurality of pressure-sensitive sensors are provided to the sensor apparatus, capacitances detected by the respective pressure-sensitive sensors are combined, and an input judgment can be performed based on the combined value. Alternatively, based on an average value obtained by dividing the combined value of the capacitances detected by the respective pressure-sensitive sensors, by the number of pressure-sensitive sensors, the input judgment can be performed.

In the embodiments described above, the number of pressure-sensitive sensors is set to be four, but it is not limited to this and may be one or more.

Seventh Embodiment

Figure 18:
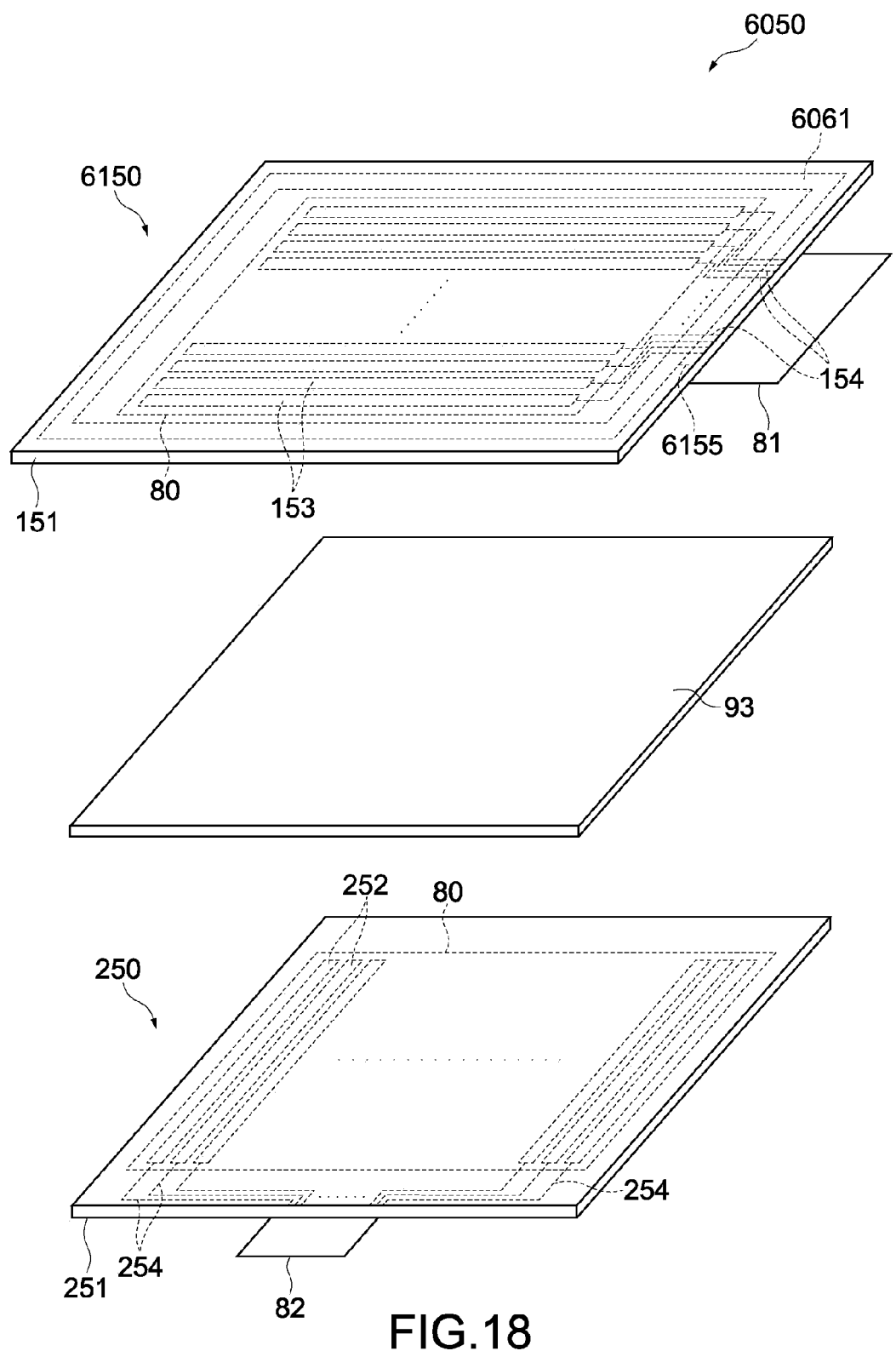
FIG. 18 An exploded perspective view of a touch panel of a sensor apparatus according to the seventh embodiment.

Next, a seventh embodiment will be described with reference to FIGS. 1 and 18. The seventh embodiment is different from the first embodiment in that an upper electrode has a frame shape and along with this, one pressure-sensitive sensor is formed. Hereinafter, the structures different from those in the first embodiment will be mainly described, and the structures that are the same as those in the first embodiment will be denoted by the same reference symbols and description thereof will be omitted or simplified. Further, the illustration of the structures that are the same as those in the first embodiment will be omitted.

FIG. 1 is a schematic cross-sectional view of an information processing apparatus including a sensor apparatus. FIG. 18 is an exploded perspective view of a touch panel of a sensor apparatus according to this embodiment.

As shown in FIG. 1, an information processing apparatus 6001 according to the seventh embodiment includes a top plate 40, a sensor apparatus 6100, a liquid crystal panel 30, a backlight 20, and a casing 10 that accommodates those above. The sensor apparatus 6100 includes a touch panel 6050 and a pressure-sensitive sensor 6060, which are bonded and fixed to each other. The single pressure-sensitive sensor 6060 is arranged in a frame shape in accordance with a frame portion of the touch panel 6050 having a flat rectangular shape. The pressure-sensitive sensor 6060 constituting a part of the sensor apparatus 6100 is fixedly arranged on the casing 10.

The pressure-sensitive sensor 6060 includes an elastic body 62, an upper electrode 6061 and a lower electrode 63 that each have a frame shape (annular shape) and are arranged so as to interpose the elastic body 62 therebetween, a bonding layer that bonds and fixes the elastic body 62 and the upper electrodes 6061, and a bonding layer that bonds and fixes the elastic body 62 and the lower electrode 63. In this embodiment, the pressure-sensitive sensor 6060 is formed by laminating the upper electrode 6061, the elastic body 62, and the lower electrode 63 each having a flat frame shape.

The touch panel 6050 is structured by sequentially laminating an X electrode substrate 6150 and a Y electrode substrate 250 and bonding them to each other by a bonding layer 93. The pressure-sensitive sensor 6060 is arranged in an area (frame portion) outside an xy-plane coordinate detection area 80 of the touch panel 6050. The X electrode substrate 6150 includes a transparent polyimide substrate 151, an X transparent electrode pattern 153 formed on the substrate 151, the upper electrode 6061 having a frame shape, wires 154 electrically connected to the X transparent electrode pattern 153, and lead wires 6155 electrically connected to the upper electrode 6061. The upper electrode 6061 may be formed simultaneously with the X transparent electrode pattern, and formed of ITO, a silver paste, or the like, and only has to be provided so as to be electrically isolated from the wires 154.

As described above, a capacitance detected by the single pressure-sensitive sensor 6060 is substantially proportional to the pressing force at any input operation position. Therefore, based on an output value of the pressure-sensitive sensor 6060, a pressing force that is input to the touch panel 6050 can be detected with high precision. In addition, the variations in detection sensitivity, which are caused by the deformation of the top plate 40 at a time of press, can be eliminated, and a sensor apparatus with excellent input sensitivity can be obtained. Further, with a frame-shaped pressure-sensitive sensor 6060, a sealing effect of preventing dust or the like from entering between the touch panel and the casing from the outside can be improved.

Eighth Embodiment

Figure 19:
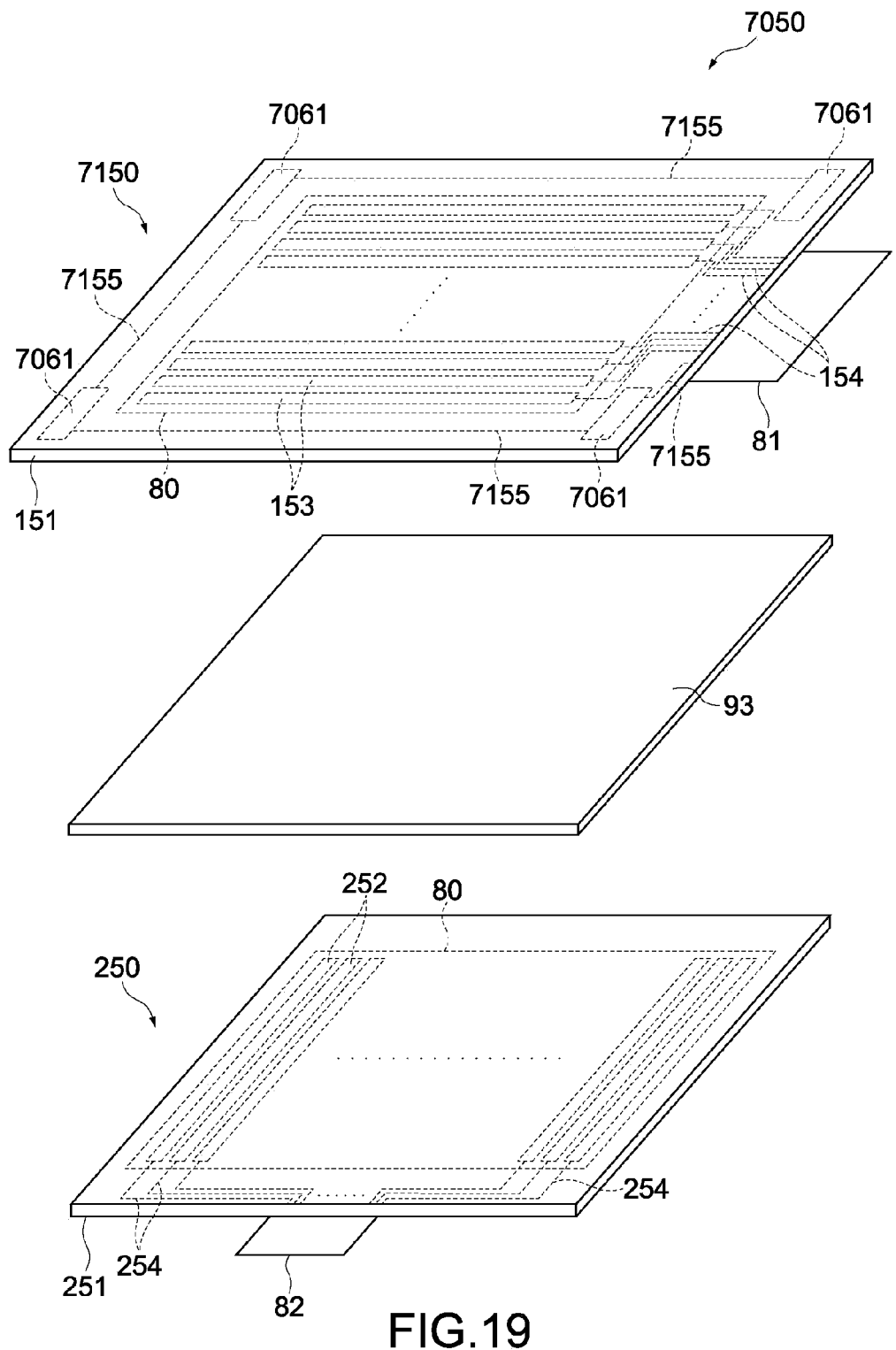
FIG. 19 An exploded perspective view of a touch panel of a sensor apparatus according to the eighth embodiment.

Next, an eighth embodiment will be described with reference to FIGS. 1 and 19. The eighth embodiment is different from the first embodiment in that four upper electrodes are electrically connected. Hereinafter, the structures different from those in the first embodiment will be mainly described, and the structures that are the same as those in the first embodiment will be denoted by the same reference symbols and description thereof will be omitted or simplified. Further, the illustration of the structures that are the same as those in the first embodiment will be omitted.

FIG. 1 is a schematic cross-sectional view of an information processing apparatus including a sensor apparatus. FIG. 19 is an exploded perspective view of a touch panel of a sensor apparatus according to this embodiment.

As shown in FIG. 1, an information processing apparatus 7001 according to the eighth embodiment includes a top plate 40, a sensor apparatus 7100, a liquid crystal panel 30, a backlight 20, and a casing 10 that accommodates those above. The sensor apparatus 7100 includes a touch panel 7050 and a pressure-sensitive sensor 7060, which are bonded and fixed to each other. The pressure-sensitive sensor 7060 constituting a part of the sensor apparatus 7100 is fixedly arranged on the casing 10. The pressure-sensitive sensor 7060 includes an elastic body 62, an upper electrode 7061 serving as a first electrode and a lower electrode 63, the upper electrode 7061 and the lower electrode 63 being arranged so as to interpose the elastic body 62 therebetween, a bonding layer that bonds and fixes the elastic body 62 and the upper electrode 7061, and a bonding layer that bonds and fixes the elastic body 62 and the lower electrode 63. In this embodiment, since a plurality of upper electrodes 7061 are connected in series, it is assumed that one pressure-sensitive sensor is provided in the sensor apparatus 7100 as a whole.

The touch panel 7050 is structured by sequentially laminating an X electrode substrate 7150 and a Y electrode substrate 250 and bonding them to each other by a bonding layer 93. The pressure-sensitive sensor 7060 is arranged in an area (frame portion) outside an xy-plane coordinate detection area 80 of the touch panel 7050. The X electrode substrate 7150 includes a transparent polyimide substrate 151, an X transparent electrode pattern 153 formed on the substrate 151, the four upper electrodes 7061, wires 154 electrically connected to the X transparent electrode pattern 153, and lead wires 7155 electrically connected to the upper electrodes 7061 to each other. The upper electrodes 7061 and the lead wires 7155 may be formed simultaneously with the X transparent electrode pattern and formed of ITO, a silver paste, or the like.

As described above, a combined value of capacitances detected by the plurality of pressure-sensitive sensors is substantially proportional to the pressing force at any input operation position. Therefore, as in this embodiment, the structure in which the plurality of upper electrodes 7061 are connected in series to thereby obtain one pressure-sensitive sensor may be possible. Accordingly, in this embodiment, it is possible to reduce the number of lead wires connected to the upper electrodes and simplify the wiring structure, as compared to the first embodiment.

Ninth Embodiment

Next, a ninth embodiment will be described with reference to FIG. 20. In the first embodiment, when the input operation surface is pressed, the pressure-sensitive sensor is deformed so as to be contracted. On the other hand, in the ninth embodiment, it may be possible to structure the elastic body of the pressure-sensitive sensor so as to be extended when the input operation surface is pressed.

Figure 20:
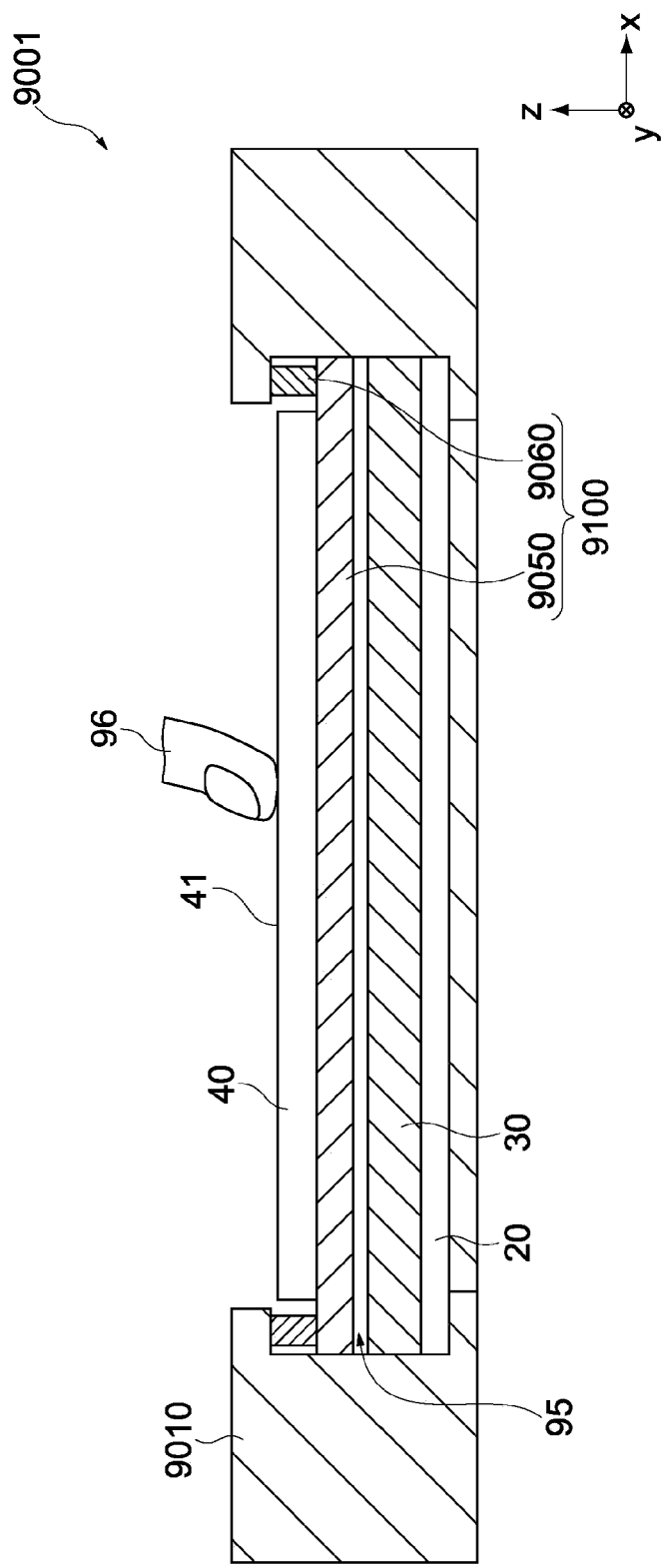
FIG. 20 A schematic cross-sectional view of an information processing apparatus according to a ninth embodiment.

FIG. 20 is a schematic cross-sectional view of an information processing apparatus including a sensor apparatus. The structures that are the same as those in the first embodiment will be denoted by the same reference symbols, and description thereof will be omitted or simplified.

As shown in FIG. 20, an information processing apparatus 9001 with a touch panel includes a top plate 40, a sensor apparatus 9100, a liquid crystal panel 30, a backlight 20, and a casing 9010 that accommodates those above. The sensor apparatus 9100 includes a touch panel 9050 and a pressure-sensitive sensor 9060.

The top plate 40 and the sensor apparatus 9100 are bonded and fixed by a bonding layer. The pressure-sensitive sensor 9060 is structured by arranging an upper electrode and a lower electrode such that an elastic body is interposed therebetween, similarly to the embodiments described above. The upper electrode and the lower electrode are not formed on the touch panel, and are formed in different steps. The upper electrode is bonded and fixed to the casing, and the lower electrode is bonded and fixed to the touch panel 9050.

The sensor apparatus 9100 includes the touch panel 9050 and the pressure-sensitive sensor 9060, which are bonded and fixed to each other. The pressure-sensitive sensor 9060 is arranged in a frame portion of a surface of the touch panel 9050 having a flat rectangular shape on the top plate side. The pressure-sensitive sensor 9060 is fixedly arranged on the casing 9010. When an input operation surface 51 is pressed with a finger in a direction perpendicular thereto (z-axis direction in the figure), an elastic body of the pressure-sensitive sensor 2060 is extended, and the touch panel 2050 to which the pressure-sensitive sensor 2060 is bonded and fixed is moved in the pressing direction at the same time. In this way, the pressure-sensitive sensor 2060 has the structure in which a thickness thereof is deformed by the press in the direction perpendicular to the input operation surface 51 (z-axis direction in the figure). Therefore, the touch panel 2050 is moved so as to come close to the liquid crystal panel 30 by a displacement of the pressure-sensitive sensor 2060 that is caused by the press with the finger. In consideration of the movement amount, a gap 95 is provided between the sensor apparatus 100 and the liquid crystal panel 30. In this way, the elastic body constituting the pressure-sensitive sensor 2060 may be extended by the press.

Figure 22:
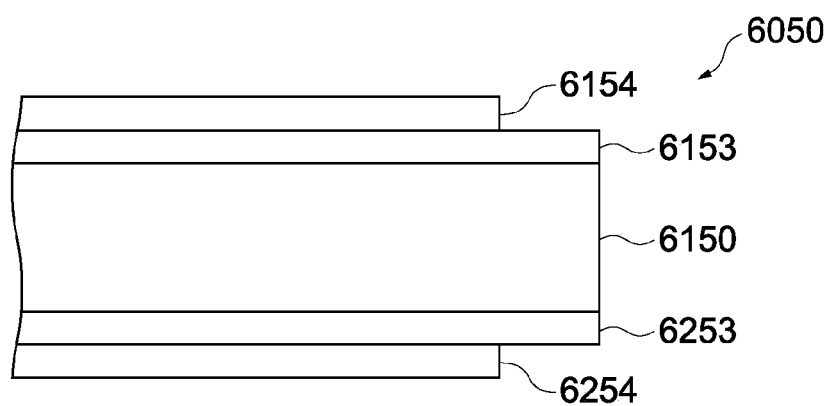
FIG. 22 A schematic cross-sectional view showing the structure of other capacitive touch panel.

In the embodiments described above, as a capacitive touch panel, one having the structure in which the X electrode substrate and the Y electrode substrate are bonded to each other is used, but the touch panel is not limited thereto and one having the well-known structure can be used. For example, like a capacitive touch panel 6050 shown in FIG. 22, it is possible to use one in which an X transparent electrode pattern 6153 and wires 6154 are provided on one surface of a substrate 6150, and a Y transparent electrode pattern 6253 and wires 6254 are provided on the other surface. Further, in the embodiments described above, as a touch panel, a capacitive one is adopted, but the touch panel is not limited thereto and a well-known touch panel can be used. For example, a touch panel of an optical system, a surface acoustic wave system, a resistive system, an ultrasonic wave system, or the like may be used.

In the embodiments described above, the width of the upper electrode and the lower electrode is desirably made larger than that of the elastic body in consideration of a positional deviation caused when those electrodes and the elastic body are bonded. Accordingly, even when a positional deviation is caused at a time of bonding, it is possible to arrange the elastic body so as to be positioned in an area in which the upper electrode and the lower electrode are formed when viewed two-dimensionally, and to obtain a pressure-sensitive sensor with a stable quality and without variation of sensor characteristics.

In the embodiments described above, the top plate and the touch panel are directly bonded and fixed to each other, the touch panel and the pressure-sensitive sensor are bonded and fixed to each other, and the pressure-sensitive sensor is bonded and fixed to the casing. However, the touch panel and the pressure-sensitive sensor may not be directly fixed to each other, and may be directly fixed to the top plate independently of each other. For example, the touch panel may be bonded to a surface opposite to an operator contact surface of the top plate, and in addition, the pressure-sensitive sensor may be bonded to a frame portion of the top plate so as not to overlap the touch panel. In the pressure-sensitive sensor, for example, the upper electrode side is bonded and fixed to the top plate, and the lower electrode side is bonded and fixed to the casing. Accordingly, the pressure-sensitive sensor is indirectly fixed to the touch panel via the top plate. Also in such a structure, when the input operation surface is pressed, the pressure-sensitive sensor can detect a pressing force by contraction or extension of the elastic body, and can also detect xy-plane coordinates by the touch panel.

Comparative Example

In the present embodiments, as a pressure-sensitive sensor, one having the structure in which an elastic body is interposed by a pair of electrodes is used and an input determination is judged using a change in capacitance due to a press. Since a capacitance and a pressing force are substantially proportional to each other, an input judgment is easy to be controlled. Here, it is compared with a pressure-sensitive sensor in which a pair of electrodes is provided so as to interpose a pressure-sensitive conductive sheet formed of an insulating polymer such as silicone in which conductive particles are dispersed. In the pressure-sensitive sensor using such a pressure-sensitive conductive sheet, it is possible to judge the presence/absence of a press by using a resistance change due to a pressing force. However, resistance and a pressing force are not proportional to each other, and a high resistance value is shown when a press is slightly added. Therefore, in the pressure-sensitive sensor using the pressure-sensitive conductive sheet, an input judgment by a press is difficult to be controlled. In contrast to this, in the pressure-sensitive sensor used in the present invention, since a capacitance and a pressing force are substantially proportional to each other, an input judgment by a press is easy to be controlled. Further, since organic substances are used in the pressure-sensitive conductive sheet, the pressure-sensitive conductive sheet is liable to deteriorate due to temporal change and has a narrow usable range of temperature, which makes it difficult to maintain stable characteristics.

The capacitive touch panel is used as a touch panel in the embodiments described above, but instead of this, a touch panel of other detection system such as a resistive system and a surface acoustic wave system may be adopted.

Figure 23:
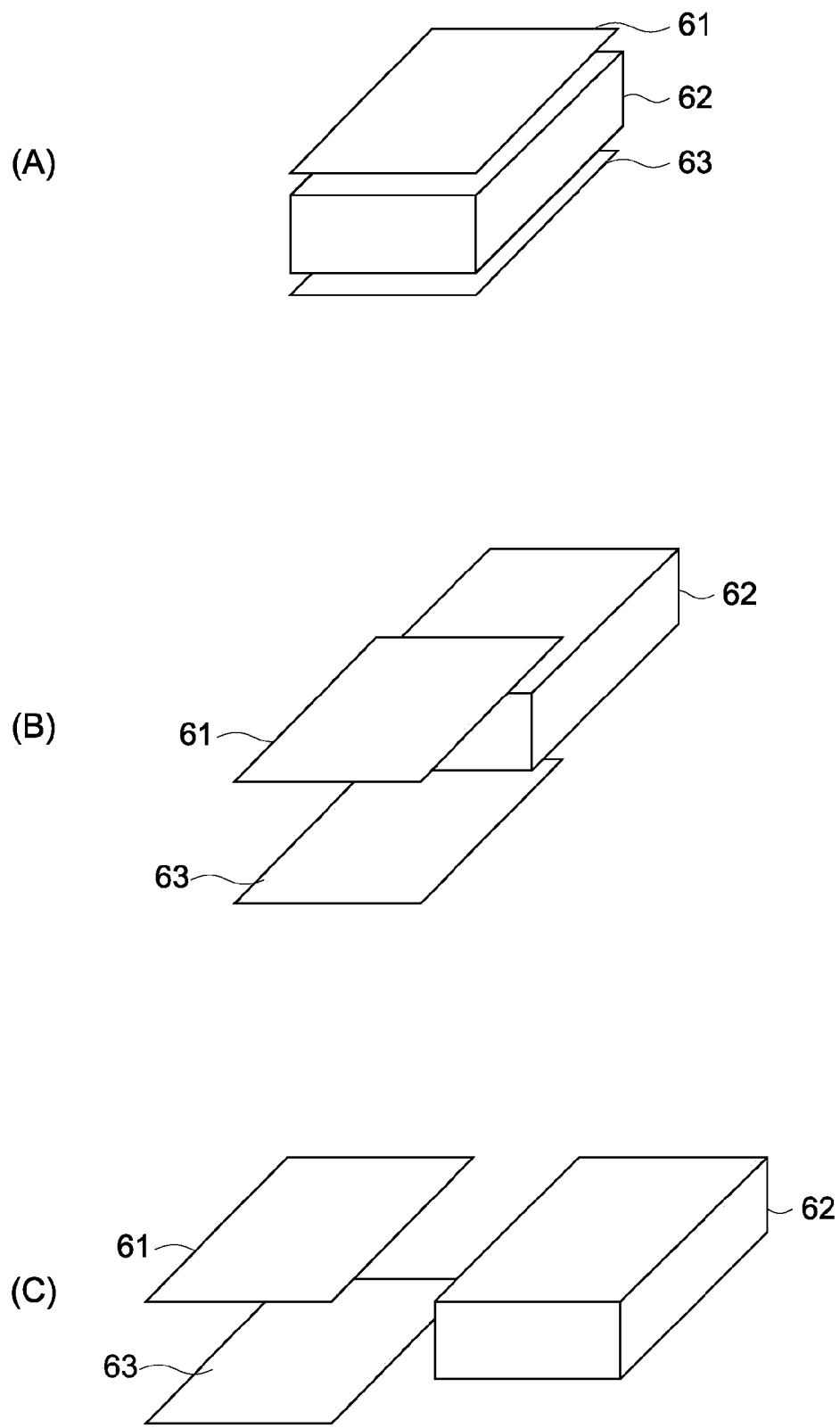
FIG. 23 Schematic perspective views of a main portion, showing modified examples of the structure of the pressure-sensitive sensor constituting the sensor apparatus.

Further, the arrangement relationship between the first electrode (upper electrode), the second electrode (lower electrode), and the elastic body that constitute the pressure-sensitive sensor is not limited to the above examples. In other words, in the embodiments described above, as shown in FIG. 23(A), the example in which the elastic body 62 is arranged between the upper electrode 61 and the lower electrode 63 such that the entire electrode surfaces of the upper electrode 61 and lower electrode 63 are opposed to the elastic body 62 has been described, though not limited to this. As shown in FIG. 23(B), the elastic body 62 may be arranged between the upper electrode 61 and the lower electrode 63 such that a part of each electrode surface of the upper electrode 61 and the lower electrode 63 is opposed to the elastic body 62. Alternatively, as shown in FIG. 23(C), the electrode surface may not be opposed to the elastic body 62. Other dielectric body other than the elastic body 62, or air (layer) can be interposed between the electrodes 61 and 63.

Figure 24:
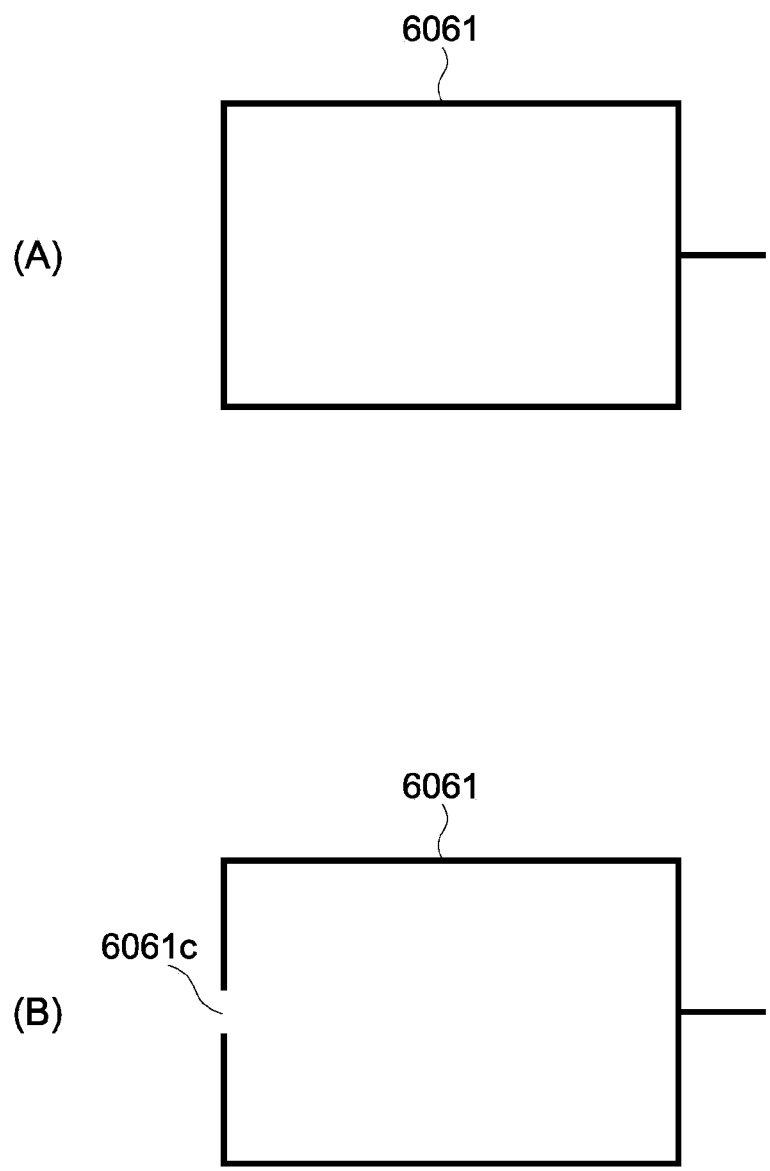
FIG. 24 A schematic plan view of an upper electrode constituting the sensor apparatus according to the seventh embodiment, and a plan view showing a modified example thereof.

Further, in the seventh embodiment described above, the example in which the upper electrode 6061 as a first electrode is formed in an annular shape has been described. The "annular shape" used herein includes a continuous annular shape as shown in FIG. 24(A), and a noncontinuous annular shape partially having a notch portion 6061c as shown in FIG. 24(B). The "annular shape" described above has the same meaning for the elastic body and the second electrode (lower electrode) that constitute the pressure-sensitive sensor.

Tenth Embodiment

Figure 25:
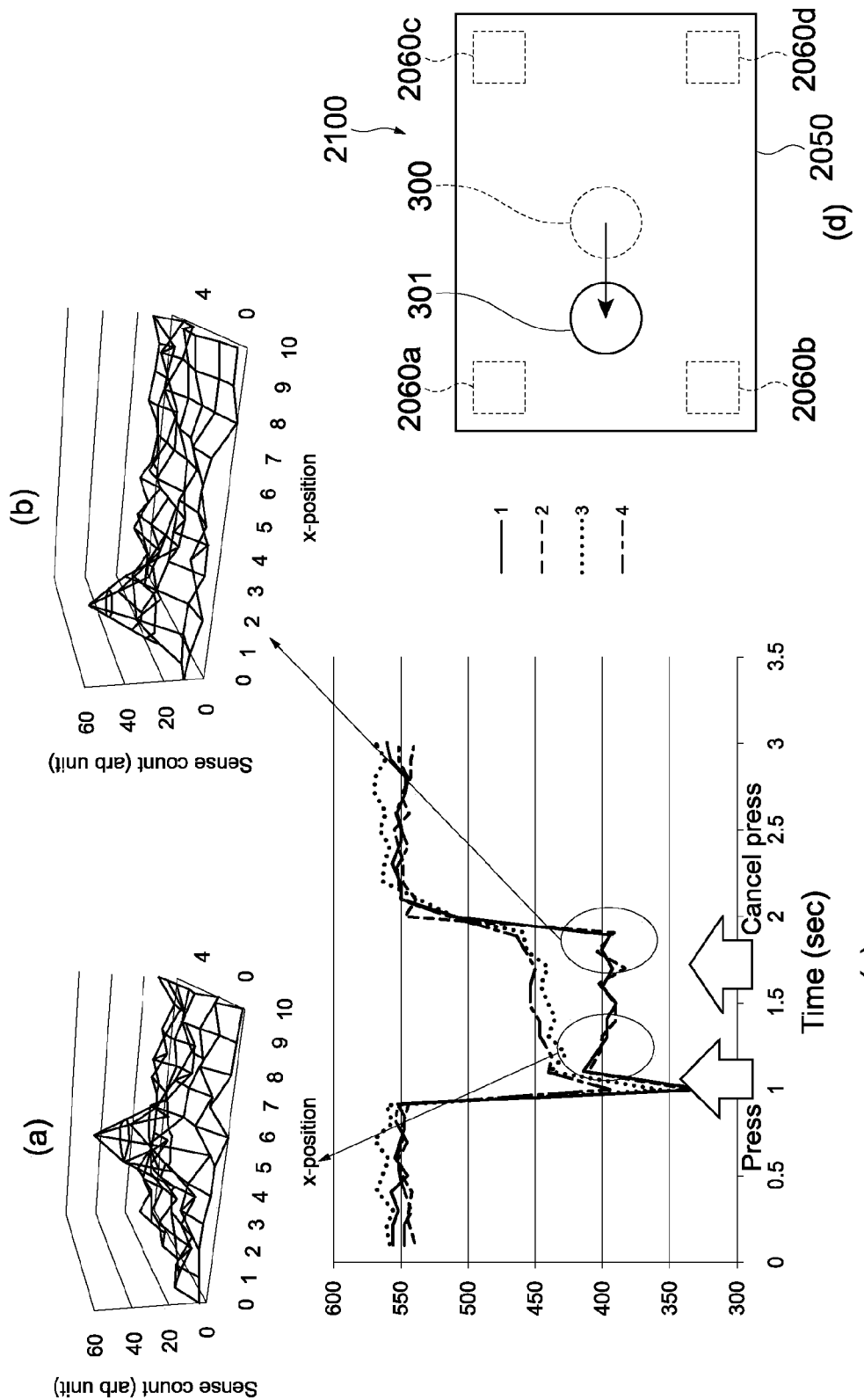
FIG. 25 Output examples of the sensor apparatus in a case where an operator is moved smoothly on the touch panel, according to a tenth embodiment.
Figure 26:
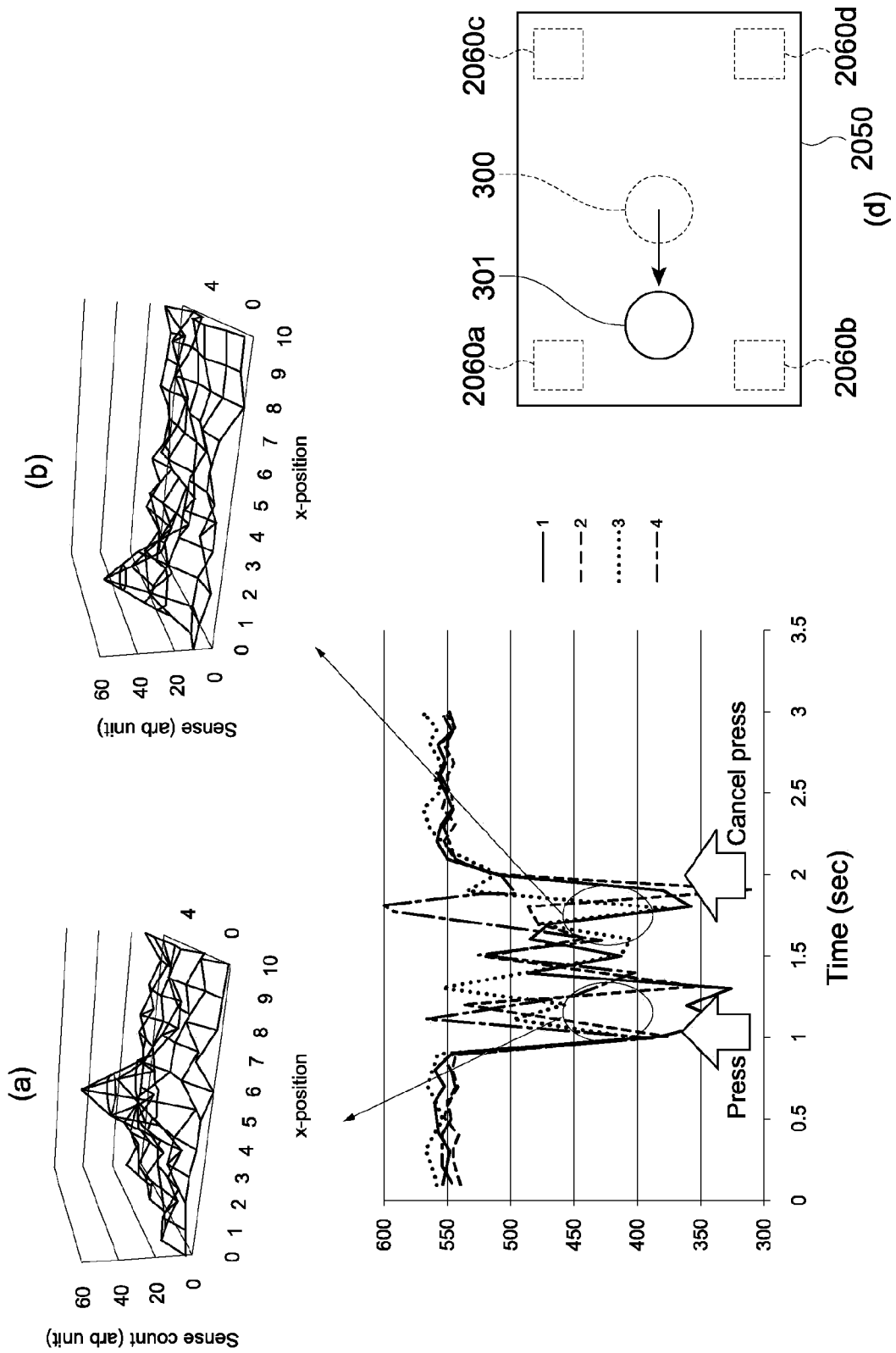
FIG. 26 Output examples of the sensor apparatus in a case where the operator is not moved smoothly on the touch panel, according to the tenth embodiment.

Next, output examples obtained from the touch panel 2050 and the pressure-sensitive sensor 2060 that constitute the sensor apparatus 2100 described in the third embodiment are shown in FIGS. 25 and 26.

FIG. 25(d) and FIG. 26(d) are schematic plan views of the sensor apparatus 2100. In the sensor apparatus 2100, a total of four pressure-sensitive sensors 2060a to 2060d are arranged one by one at four corners of the touch panel 2050. In FIG. 25(d) and FIG. 26(d), a state of an input determination, that is, an operator in a pressed state being moved from a position 300 to a position 301 (in the figures, the state of moving from the right to the left) is shown. FIG. 25(a), FIG. 25(b), FIG. 26(a), and FIG. 26(b) three-dimensionally show outputs obtained from the touch panel 2050 and the pressure-sensitive sensor 2060, each plane constituted of the horizontal axis and vertical axis corresponds to the XY plane screen of the touch panel 2050, and a height axis shows the magnitude of an output. FIG. 25(a) and FIG. 26(a) are output diagrams at a time when the operator is put at the position 300. FIG. 25(b) and FIG. 26(b) are output diagrams at a time when the operator is put at the position 301. FIG. 25(c) and FIG. 26(c) are diagrams showing temporal change of output values of the four pressure-sensitive sensors 2060a to 2060d, in which the vertical axis represents an output, and the horizontal axis represents a time. In each of FIG. 25(c) and FIG. 26(c), a solid line 1 represents an output of the pressure-sensitive sensor 2060a, a long dashed line 2 represents an output of the pressure-sensitive sensor 2060b, a short dashed line 3 represents an output of the pressure-sensitive sensor 2060c, and an alternate long and short dashed line 4 represents an output of the pressure-sensitive sensor 2060d.

FIG. 25 show a case where the operator is moved smoothly on the touch panel 2050. FIG. 26 show a case where the operator is not moved smoothly on the touch panel. For example, FIG. 26 show a case where an input is made with a nondominant hand. In a case where an input is made with a nondominant hand, the operator cannot be moved smoothly on the touch panel 2050, and there may be a case where a moving speed of the operator or the way a force is applied does not become constant. Further, for example, when an input is not made while the sensor apparatus 2100 is placed at a fixed position such as a desk but an input is made with the sensor apparatus 2100 in hand, it is also difficult to move the operator smoothly, and there may be a case where a moving speed of the operator or the way a force is applied does not become constant. In a case where the operator is moved smoothly, as shown in FIG. 25(c), the temporal change of the outputs from the respective pressure-sensitive sensors 2060a to 2060d is less varied and stable. In contrast to this, in the case where the operator is not moved smoothly, as shown in FIG. 26(c), variation in temporal change of the outputs from the respective pressure-sensitive sensors 2060a to 2060d is large. Therefore, it is difficult to correctly judge whether an input operation made with the operator is an erroneous input or a correct input, which is not an erroneous input but just an output variation largely detected due to some sort of cause, for example, a cause such as an input made with the sensor apparatus 2100 in hand as described above.

Figure 27:
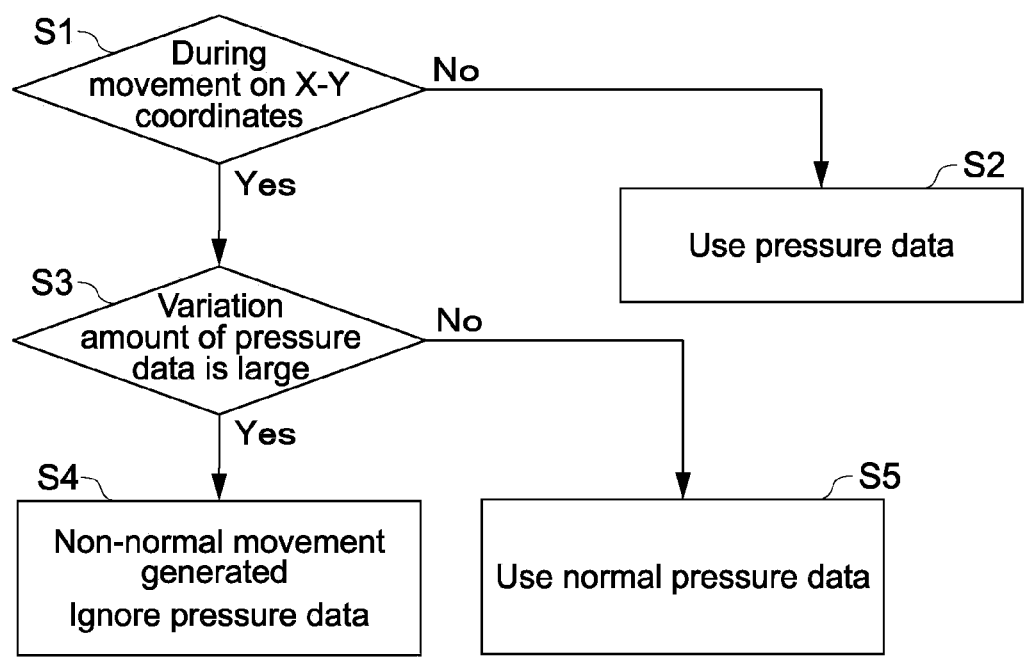
FIG. 27 A flowchart of a program for judging whether an input operation is an erroneous input or not according to the tenth embodiment.

In this regard, in this embodiment, a program for judging, in the case where the operator is not moved smoothly, whether an input operation thereof is an erroneous input or not is incorporated in the computing circuit (judgment unit) provided on the circuit board. FIG. 27 shows a processing flow thereof.

As shown in FIG. 27, in Step 1 (S1), it is judged whether the operator is being moved on the touch panel 2050, from xy coordinates output results detected from the touch panel 2050.

When it is judged in S1 that the operator is not being moved, pressure data as output results from the pressure-sensitive sensor 2060 (2060a to 2060d) is adopted in Step 2 (S2), and based on the pressure data, it is judged whether an input determination has been made by a press of the operator.

On the other hand, it is judged in S1 that the operator is being moved, in Step 3 (S3), it is judged whether a variation amount of the pressure data detected from the pressure-sensitive sensor 2060 within a predetermined period of time is large. For example, when it is observed three times within a predetermined period of time, for example, in 100 msec, that the continuously-output pressure data of the respective pressure-sensitive sensors vary ±30% or more as compared to pressure data output immediately before the pressure data, the variation amount of the pressure data is judged to be large. It should be noted that the judgment whether a variation amount of the pressure data is large or not is not limited to this.

When it is judged in S3 that the variation amount is large, it is judged in Step 4 (S4) that the movement of the operator is not normal and judged as an erroneous input, the pressure data output from the pressure-sensitive sensor 2060 is ignored, and it is judged not to be an input determination operation made by a press of the operator.

On the other hand, when it is judged in S3 that the variation amount is small, in Step 5 (S5), the pressure data output from the pressure-sensitive sensor 2060 is not used, and normal pressure data that has been input in advance is adopted and it is judged as an input determination operation.

As described above, in this embodiment, based on the magnitude of the variation in temporal change of the output from the pressure-sensitive sensor, it is possible to judge whether the input operation is made by a normal movement of the operator, or is not made by a normal movement of the operator (erroneous input). Then, in a case where it is judged to be a normal movement, the input operation is judged to be an input. In a case where it is judged not to be a normal movement, it is judged that the input operation does not exist. In this way, the presence/absence of an input made by the operator is judged based on the magnitude of the variation in temporal change of the output from the pressure-sensitive sensor, with the result that even when an input operation involving the nonsmooth movement of the operator is made, if a variation of the output from the pressure-sensitive sensor is small, it is judged to be a normal movement and then to be an input. Here, the sensor apparatus having the structure shown in the third embodiment is described as an example, but this program is applicable to a sensor apparatus shown in the other embodiments described above.

Eleventh Embodiment

Next, use examples of the information processing apparatuses described above will be described with reference to FIG. 28, FIG. 29, and FIG. 30. Here, the sensor apparatus 100 described in the first embodiment will be described as an example, but the usage examples are applicable to the sensor apparatuses described in the other embodiments.

Figure 28:
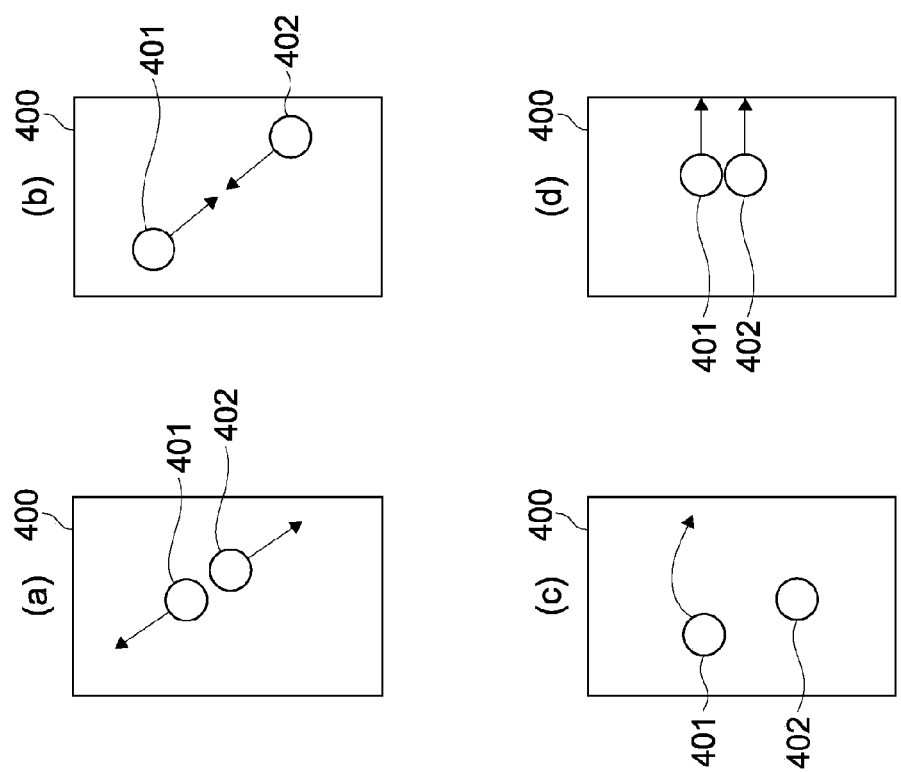
FIG. 28 Schematic plan views of a touch panel, showing a conventional image processing method.
Figure 29:
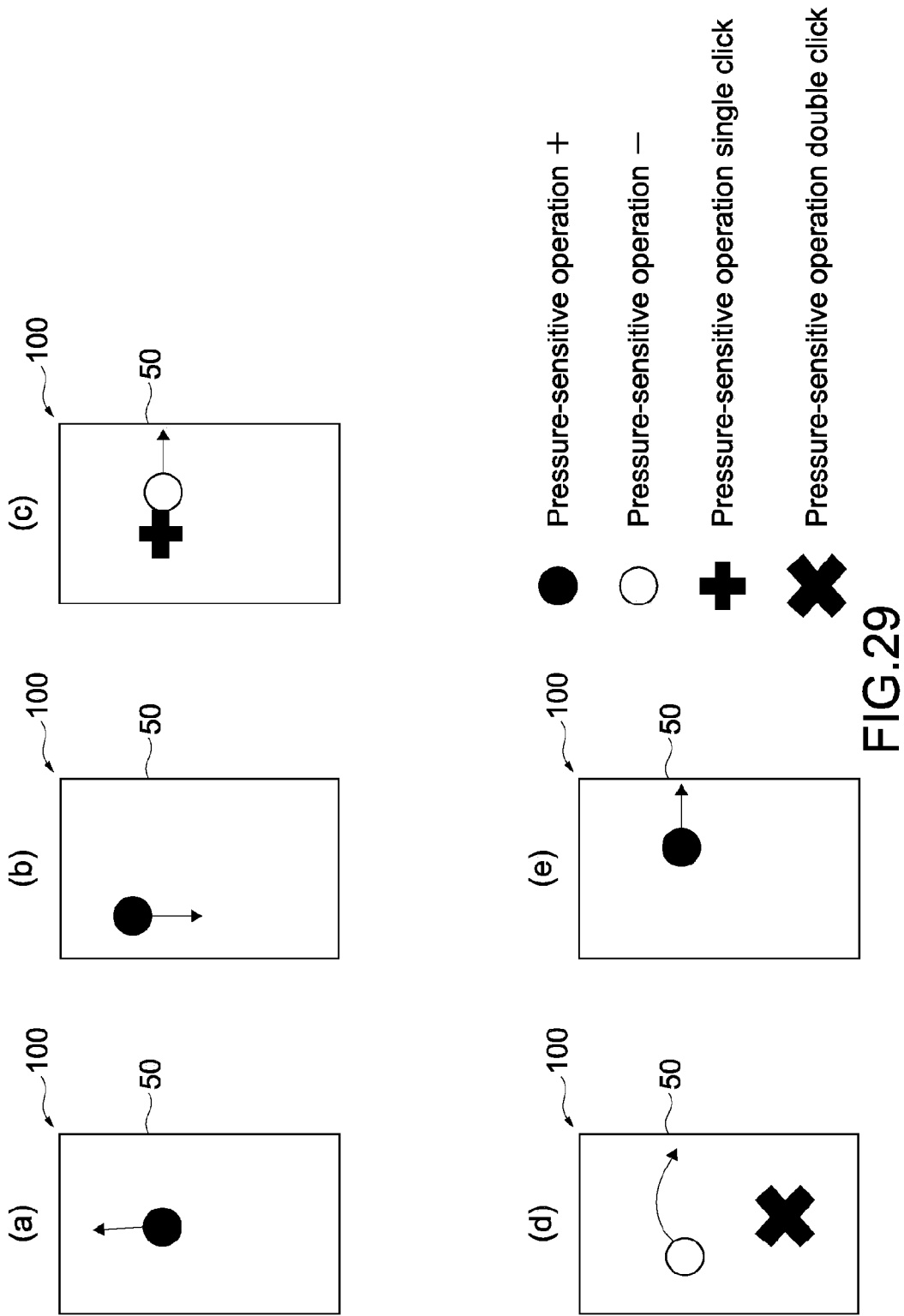
FIG. 29 Schematic plan views of a sensor apparatus, showing an image processing method by the sensor apparatus according to an eleventh embodiment.
Figure 30:
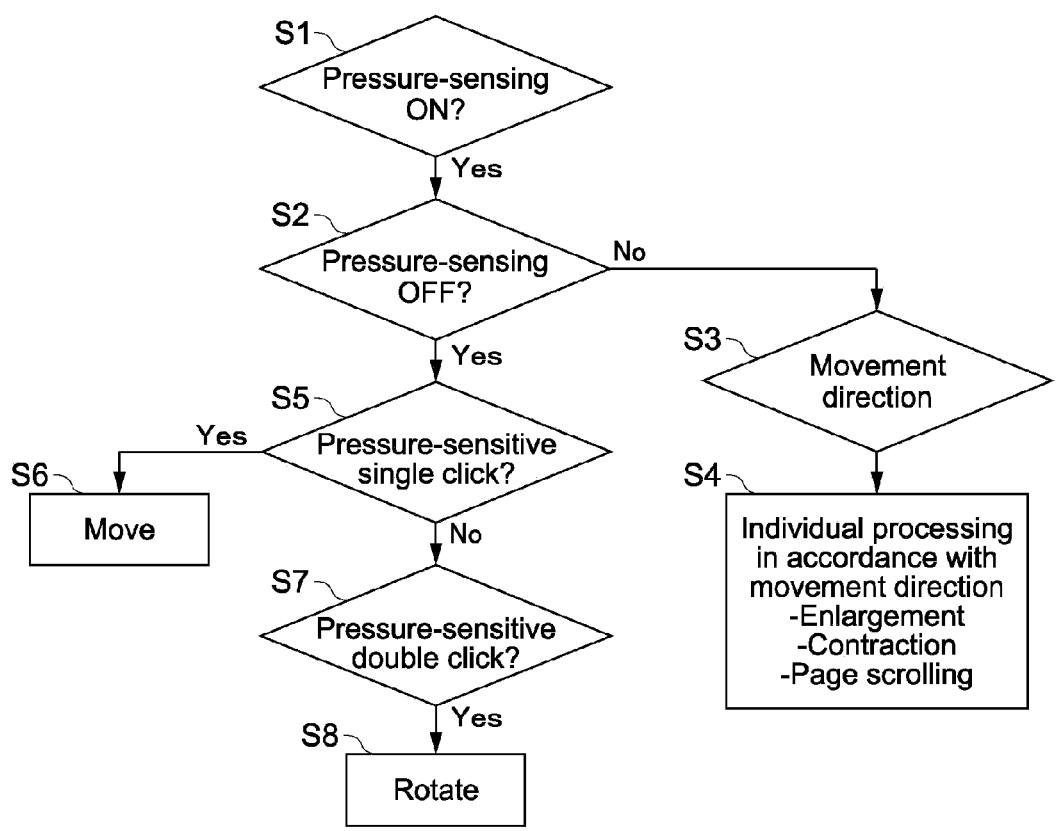
FIG. 30 A flowchart of a program of the image processing shown in FIG. 29.

FIG. 28 are schematic plan views showing a conventional image processing technique using two fingers. FIG. 28(a) shows the movement of the two fingers when giving an instruction to enlarge an image; FIG. 28(b), to contract an image; FIG. 28(c), to rotate an image; and FIG. 28(d), to move an image. FIG. 29 are schematic plan views showing an image processing technique using one operator, according to this embodiment. FIG. 29(a) shows the movement of the operator when giving an instruction to enlarge an image; FIG. 29(b), to contract an image; FIG. 29(c), to move an image; FIG. 29(d), to rotate an image; and FIG. 29(e), to perform an operation of page scrolling, or scrolling to the top of file or the end of file. A program for performing the enlargement, contraction, rotation, movement, and the like of an image with use of one operator can be incorporated in, for example, a computing circuit (judgment unit) provided on a circuit board. FIG. 30 is a flowchart of this program for the image processing.

As shown in FIG. 28, conventionally, two fingers are used when enlarging, contracting, rotating, or moving an image displayed on the touch panel 400. As shown in FIG. 28(a), in a case where an image is enlarged, for example, an index finger is put at a position 401 and a thumb is put at a position 402, and the fingers are moved in the arrow directions, thus making an operation of increasing a distance between the two fingers. As shown in FIG. 28(b), in a case where an image is contracted, for example, the index finger and the thumb are put at the position 401 and the position 402, respectively, and are moved in the arrow directions, thus making an operation of reducing the distance between the two fingers. As shown in FIG. 28(c), in a case where an image is rotated, for example, the index finger and the thumb are put at the position 401 and the position 402, respectively, and the index finger is moved in a desired direction of rotation with the thumb 402 as a base point. As shown in FIG. 28(d), in a case where an image is moved, for example, the index finger and the thumb are put at the position 401 and the position 402, respectively, and are moved in a desired direction of movement.

On the other hand, in this embodiment, in a case where an image is enlarged, as shown in FIG. 29(a) and FIG. 30, a point on the touch panel 50 of the sensor apparatus 100 is pressed with the operator, and accordingly whether pressure-sensing is ON or not is judged to be YES in Step 1 (S1). Then, the press is maintained, and accordingly whether pressure-sensing is OFF or not is judged to be NO in Step 2 (S2). Then, while the press is maintained, the operator is moved to an upper portion of the screen, with the result that the movement direction is recognized in Step 3 (S3) and it is judged in Step 4 (S4) that an instruction of enlargement is made.

In a case where an image is contracted, as shown in FIG. 29(b) and FIG. 30, a point on the touch panel 50 is pressed with the operator, and accordingly whether pressure-sensing is ON or not is judged to be YES in Step 1 (S1). Then, the press is maintained, and accordingly whether pressure-sensing is OFF or not is judged to be NO in Step 2 (S2). Then, while the press is maintained, the operator is moved to a lower portion of the screen, with the result that the movement direction is recognized in Step 3 (S3) and it is judged in Step 4 (S4) that an instruction of contraction is made.

In a case where an image is moved, as shown in FIG. 29(c) and FIG. 30, when a point on the touch panel 50 is pressed once (single click) with the operator, and accordingly whether pressure-sensing is ON or not is judged to be YES in Step 1 (S1), and whether pressure-sensing is OFF or not is further judged to be YES in Step 2 (S2). Then, in a case where there are no additional clicks, it is judged to be a pressure-sensitive single click in Step 5 (S5), and when the operator is moved in a state where the press is canceled, it is judged in Step 6 (S6) that an instruction of movement is given.

In a case where an image is rotated, as shown in FIG. 29(d) and FIG. 30, the base point is pressed twice (double click) with the operator, and accordingly whether pressure-sensing is ON or not is judged to be YES in Step 1 (S1), and whether pressure-sensing is OFF or not is further judged to be YES in Step 2 (S2). Then, since there is an additional click (double click), it is judged not to be a pressure-sensitive single click in Step 5 (S5), and it is judged to be YES in Step 7 (S7) and judged in Step 8 (S8) that an instruction of rotation is given. Next, the operator is moved to a position away from the base point, and then moved in a direction of rotation in a state where the press is canceled, thus performing a rotation operation.

In a case of the page scrolling, or scrolling to the top of file or the end of file, as shown in FIG. 29(e) and FIG. 30, a point on the touch panel 50 of the sensor apparatus 100 is pressed with the operator, and accordingly whether pressure-sensing is ON or not is judged to be YES in Step 1 (S1). Then, the press is maintained, and accordingly whether pressure-sensing is OFF or not is judged to be NO in Step 2 (S2). Then, the operator is moved on the touch panel 50 in a right direction or left direction, with the result that the movement direction is recognized in Step 3 (S3), and it is judged in Step 4 (S4) that an instruction of page scrolling, or scrolling to the top of file or the end of file is given. In FIG. 29, a state of being judged as an input due to a press of the operator is referred to as a pressure-sensitive operation +, indicated by a black circle, and a state of not being judged as an input, in which a press by the operator is not made, is referred to as a pressure-sensitive operation −, indicated by a white circle. One-time input operation (single click) made by a press of the operator is indicated by +. Two-time input operations (double click) made by a press of the operator is indicated by ×.

In this embodiment, programming is made such that if the movement of the operator in the early 60 msec is within about ±30 degrees or from about 150 degrees to 210 degrees from the horizontal direction (right and left direction on the screen) on the XY plane, it is judged that the movement is made in the horizontal direction. Further, programming is made such that if the movement of the operator in the early 60 msec is within about 60 to 120 degrees or 240 degrees to 300 degrees from the horizontal direction (right and left direction on the screen) on the XY plane, it is judged that the movement is made in the vertical direction (up-and-down direction on the screen). Then, programming is made such that in the cases not included in those ranges, it is not judged that an instruction of enlargement, contraction, or the like is given, and it is judged that the movement is made in the horizontal direction if the position obtained 140 msec later is in a range of about ±40 degrees or from about 140 degrees to 220 degrees from the horizontal direction, or judged that the movement is made in the vertical direction if the position is in a range of 50 to 130 degrees or 230 degrees to 310 degrees from the horizontal direction. Then, programming is made such that in the cases not included in those ranges, it is not judged that an instruction of enlargement, contraction, or the like is given.

As described above, in the use examples shown in this embodiment, one operator suffices, with the result that the operability is excellent as compared to a case where two operators are necessary.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A sensor apparatus comprising:
a touch panel that includes an input operation surface and an electrode pattern formed on a substrate, the electrode pattern located inside a coordinate detection area in a lateral plane, to detect a coordinate position at which an operator comes into contact with the input operation surface directly or indirectly;
a casing configured to accommodate the touch panel;
a plurality of pressure-sensitive sensors, each of which is located in a circumferential area that is outside of the coordinate detection area, and includes a first electrode directly fixed to the substrate and separate from the electrode pattern, a second electrode directly fixed to the casing, and an elastic body arranged between the substrate and the casing and elastically supporting the substrate with respect to the casing, and detects a pressing force input to the input operation surface, as a change of a capacitance between the first and second electrodes, such that coordinate detection and pressure detection both occur in the lateral plane, wherein the plurality of pressure-sensitive sensors includes a first pressure-sensitive sensor and a second pressure-sensitive sensor; and
a judgment unit configured to judge whether an input made by the operator is an erroneous input based on a first magnitude of a first variation in capacitance in a temporal change over a predetermined time period of a first output from the first pressure-sensitive sensor and a second magnitude of a second variation in capacitance in the temporal change over the predetermined time period of a second output from the second pressure-sensitive sensor, the first variation in capacitance being in an opposite direction from the second variation in capacitance, by determining, during movement of the coordinate position in a lateral direction, whether the first magnitude of the first variation in capacitance and the second magnitude of the second variation in capacitance both exceed a predetermined threshold, and responsive to determining that the first magnitude of the first variation in capacitance and the second magnitude of the second variation in capacitance both exceed the predetermined threshold, judging the input made by the operator as the erroneous input.

2. The sensor apparatus according to claim 1, wherein the first electrode has a shape different from that of the elastic body.

3. The sensor apparatus according to claim 1, wherein the elastic body has Young's modulus of 0.001 to 2 MPa and a response speed having a recovery time of 400 ms or less.

4. The sensor apparatus according to claim 1, wherein the input operation surface has a rectangular shape, and the plurality of pressure-sensitive sensors are arranged at each of four corners of the touch panel.

5. The sensor apparatus according to claim 4, wherein the elastic body is formed in an annular shape along a circumference of the touch panel.

6. The sensor apparatus according to claim 5, wherein the first electrode is formed correspondingly to each of the four corner positions of the touch panel, and the plurality of first electrodes are electrically connected to each other.

7. The sensor apparatus according to claim 5, wherein the first and second electrodes are each formed in the annular shape along the circumference of the touch panel.

8. The sensor apparatus according to claim 1, wherein the touch panel includes a first substrate having a first electrode pattern, a second substrate having a second electrode pattern, and a bonding layer that bonds the first substrate and the second substrate to each other, and the first electrode of each one of the plurality of pressure-sensitive sensors is formed on the first substrate of the touch panel.

9. The sensor apparatus according to claim 1, wherein the first electrode includes two electrode portions that are opposed to the second electrode with the elastic body being interposed therebetween.

10. The sensor apparatus according to claim 1, further comprising:
a first conductor layer provided to correspond to the second electrode; and
a first dielectric layer that is provided between the first conductor layer and the second electrode, and has a dielectric constant smaller than that of the elastic body.

11. The sensor apparatus according to claim 1, further comprising:
a second conductor layer provided to correspond to the first electrode; and
a second dielectric layer that is provided between the second conductor layer and the first electrode, and has a dielectric constant smaller than that of the elastic body.

12. The sensor apparatus according to claim 1, wherein the touch panel is a capacitive touch panel.

13. An information processing apparatus comprising:
a touch panel that includes an input operation surface and an electrode pattern formed on a substrate, the electrode pattern located inside a coordinate detection area in a lateral plane, to detect a coordinate position at which an operator comes into contact with the input operation surface directly or indirectly;
a casing configured to accommodate the touch panel;
a plurality of pressure-sensitive sensors, each of which is located in a circumferential area that is outside of the coordinate detection area, and includes a first electrode directly fixed to the substrate and separate from the electrode pattern, a second electrode directly fixed to the casing, and an elastic body arranged between the substrate and the casing and elastically supporting the substrate with respect to the casing, and detects a pressing force input to the input operation surface, as a change of a capacitance between the first and second electrodes, such that coordinate detection and pressure detection both occur in the lateral plane, wherein the plurality of pressure-sensitive sensors includes a first pressure-sensitive sensor and a second pressure-sensitive sensor;
a display panel that is arranged on a back surface side of the touch panel and accommodated in the casing; and a judgment unit configured to judge whether an input made by the operator is an erroneous input based on a first magnitude of a first variation in capacitance in a temporal change over a predetermined time period of a first output from the first pressure-sensitive sensor and a second magnitude of a second variation in capacitance in the temporal change over the predetermined time period of a second output from the second pressure-sensitive sensor, the first variation in capacitance being in an opposite direction from the second variation in capacitance, by determining, during movement of the coordinate position in a lateral direction, whether the first magnitude of the first variation in capacitance and the second magnitude of the second variation in capacitance both exceed a predetermined threshold, and responsive to determining that the first magnitude of the first variation in capacitance and the second magnitude of the second variation in capacitance both exceed the predetermined threshold, judging the input made by the operator as the erroneous input.

* * * * *